(12) United States Patent
Kobayashi et al.

(10) Patent No.: US 9,883,146 B2
(45) Date of Patent: Jan. 30, 2018

(54) COMMUNICATION SYSTEM, COMMUNICATION APPARATUS AND COMMUNICATION METHOD

(71) Applicant: PANASONIC CORPORATION, Osaka (JP)

(72) Inventors: Masaaki Kobayashi, Fukuoka (JP); Masakatsu Matsuo, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 206 days.

(21) Appl. No.: 14/249,838

(22) Filed: Apr. 10, 2014

(65) Prior Publication Data

US 2014/0307090 A1 Oct. 16, 2014

(30) Foreign Application Priority Data

Apr. 12, 2013 (JP) ................. 2013-083532

(51) Int. Cl.
| | |
|---|---|
| *H04N 7/18* | (2006.01) |
| *H04N 11/02* | (2006.01) |
| *H04N 7/12* | (2006.01) |
| *H04J 3/16* | (2006.01) |
| *H04L 9/32* | (2006.01) |
| *H04N 21/2343* | (2011.01) |
| *H04N 21/2347* | (2011.01) |

(52) U.S. Cl.
CPC ......... *H04N 7/18* (2013.01); *H04N 21/23476* (2013.01); *H04N 21/234327* (2013.01)

(58) Field of Classification Search
CPC ............... H04N 7/18; H04N 21/23476; H04N 21/234327

USPC .......................................... 348/143; 343/143
See application file for complete search history.

(56) References Cited

U.S. PATENT DOCUMENTS

| | | |
|---|---|---|
| 5,852,648 A | 12/1998 | Miyamoto et al. |
| 6,931,534 B1 | 8/2005 | Jandel et al. |
| 7,515,714 B2 | 4/2009 | Orihashi et al. |
| | (Continued) | |

FOREIGN PATENT DOCUMENTS

| | | |
|---|---|---|
| CN | 102037490 | 4/2011 |
| CN | 10243283 | 5/2012 |
| | (Continued) | |

OTHER PUBLICATIONS

Search report from P.C.T., dated Jul. 4, 2014.
(Continued)

*Primary Examiner* — Hee-Yong Kim
(74) *Attorney, Agent, or Firm* — Greenblum & Bernstein, P.L.C.

(57) ABSTRACT

A communication system includes a first communication apparatus and a second communication apparatus. The first communication apparatus includes a partial image data generation unit, configured to generate partial image data which is obtained by extracting a partial component from image data, and a transmission unit, configured to transmit the partial image data generated by the partial image data generation unit to the second communication apparatus. The second communication apparatus includes a reception unit, configured to receive the partial image data transmitted by the transmission unit of the first communication apparatus.

8 Claims, 30 Drawing Sheets

(56) References Cited

U.S. PATENT DOCUMENTS

| | | |
|---|---|---|
| 7,990,479 B2 | 8/2011 | Hattori |
| 8,326,921 B2 | 12/2012 | Naka |
| 2004/0081338 A1 | 4/2004 | Takenaka |
| 2004/0196972 A1 | 10/2004 | Zhu et al. |
| 2005/0175104 A1* | 8/2005 | Honda ................ H04N 7/1675 375/240.18 |
| 2006/0023748 A1* | 2/2006 | Chandhok ......... H04L 29/06027 370/469 |
| 2007/0118737 A1 | 5/2007 | Shimizu |
| 2007/0143856 A1 | 6/2007 | Aerrabotu et al. |
| 2007/0211798 A1* | 9/2007 | Boyce .................... H04N 19/61 375/240.16 |
| 2008/0002776 A1* | 1/2008 | Borer ............... H04N 21/23424 375/240.26 |
| 2008/0232596 A1 | 9/2008 | Matsukawa et al. |
| 2011/0123068 A1 | 5/2011 | Miksa et al. |
| 2012/0151601 A1 | 6/2012 | Inami et al. |

FOREIGN PATENT DOCUMENTS

| | | |
|---|---|---|
| EP | 1465426 | 10/2004 |
| JP | 03-105483 | 5/1991 |
| JP | 10-191100 | 7/1998 |
| JP | 2002-359836 | 12/2002 |
| JP | 2004-062560 | 2/2004 |
| JP | 2007-010862 | 1/2007 |
| JP | 2007-013394 | 1/2007 |
| JP | 2007-128470 | 5/2007 |
| JP | 2008-234597 | 10/2008 |
| JP | 2008-288744 | 11/2008 |
| JP | 2010-103867 | 5/2010 |
| WO | 00/31964 | 6/2000 |

OTHER PUBLICATIONS

Office Action issued in JAPAN Counterpart Patent Appl. No. 2013-083532, dated May 30, 2017, along with an English translation thereof.

Office Action issued in China Counterpart Patent Appl. No. Sep. 13, 2018, dated 201480020935.4 , along with an english translation thereof.

Office Action issued in Japan Counterpart Patent Appl. No. Sep. 5, 2017, dated 2013-083532 , along with an english translation thereof.

* cited by examiner

| 1/9 | 1/9 | 1/9 |
|---|---|---|
| 1/9 | 1/9 | 1/9 |
| 1/9 | 1/9 | 1/9 |

| 1/16 | 2/16 | 1/16 |
|---|---|---|
| 2/16 | 4/16 | 2/16 |
| 1/16 | 2/16 | 1/16 |

FIG. 18
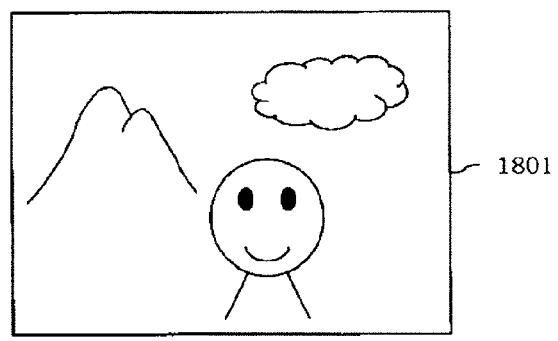
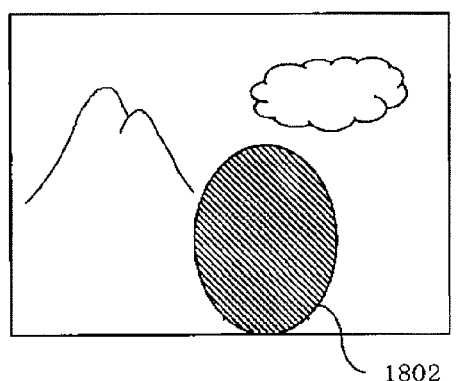
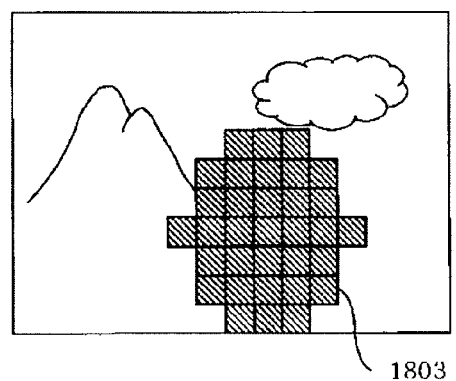

(a) 4×4 PIXELS (b) 6×6 PIXELS (c) 8×8 PIXELS

COMMUNICATION SYSTEM, COMMUNICATION APPARATUS AND COMMUNICATION METHOD

BACKGROUND

1. Field of the Invention

The present invention relates to a communication system using a monitoring camera, for example, a communication apparatus and a communication method.

2. Description of the Related Art

Hitherto, in a monitoring camera system, there has been a technique in which a portion hidden by a mask is restored in case of emergency such as the occurrence of a crime while achieving the protection of privacy by hiding a portion of a region using the mask, which leads to the achievement of both security and privacy (see, for example, JP-A-2008-288744).

SUMMARY

However, in the above related art, the contents of the portion hidden by the mask cannot be confirmed, and the contents irrelevant to privacy such as, for example, whether a person is present in a shop cannot be confirmed when an image is not restored.

In addition, when noise processing is performed on an image through superimposition or the like in a case where the image is hidden by the mask, an image before hidden by the mask may not be restored when the portion hidden by the mask is desired to be confirmed in case of emergency, or the like.

A non-limited object of the present invention is to provide a communication system, a communication apparatus and a communication method which are capable of confirming the contents of an image without restoring the image while protecting privacy, and may be capable of restoring the privacy-protected image to an original image.

An aspect of the present invention provides a communication system that includes a first communication apparatus and a second communication apparatus, wherein the first communication apparatus includes: a partial image data generation unit, configured to generate partial image data which is obtained by extracting a partial component from image data; and a transmission unit, configured to transmit the partial image data generated by the partial image data generation unit to the second communication apparatus, and the second communication apparatus includes: a reception unit, configured to receive the partial image data transmitted by the transmission unit of the first communication apparatus.

Another aspect of the present invention provides a communication apparatus including: a partial image data generation unit, configured to generate partial image data which is obtained by extracting a partial component from image data; and a transmission unit, configured to transmit the partial image data generated by the partial image data generation unit to another communication apparatus.

Still another aspect of the present invention provides a communication apparatus including: a reception unit, configured to receive partial image data and difference image data from another communication apparatus, wherein the partial image data is obtained by extracting a partial component from the image data, and the difference image data indicates a difference between the image data and the partial image data; and an image synthesis unit, configured to synthesize the partial image data and the difference image data received by the reception unit and restore the image data.

Still another aspect of the present invention provides a communication method including: generating partial image data which is obtained by extracting a partial component from image data; transmitting the generated partial image data; and receiving the transmitted partial image data.

Still another aspect of the present invention provides a communication method including: generating partial image data which is obtained by extracting a partial component from image data; and transmitting the generated partial image data.

Still another aspect of the present invention provides a communication method including: receiving partial image data and difference image data from another communication apparatus, wherein the partial image data is obtained by extracting a partial component from the image data, and the difference image data indicates a difference between the image data and the partial image data; and synthesizing the received partial image data and the received difference image data and restoring the image data.

According to the communication system, the communication apparatus and the communication method in aspects of the present invention, it is possible to confirm the contents of an image without restoring the image while protecting privacy. It is also applicable to restore the privacy-protected image to an original image.

BRIEF DESCRIPTION OF THE DRAWINGS

In the accompanying drawings:

FIG. 18 is a diagram illustrating a mask region setting method;

DETAILED DESCRIPTION

Embodiments of a communication system, a communication apparatus and a communication method according to the present invention will be described with reference to the accompanying drawings. Meanwhile, in the present embodiments, an example of a monitoring camera system will be described, but the embodiments can also be appropriately applied to other systems.

Embodiment 1

Figure 1:
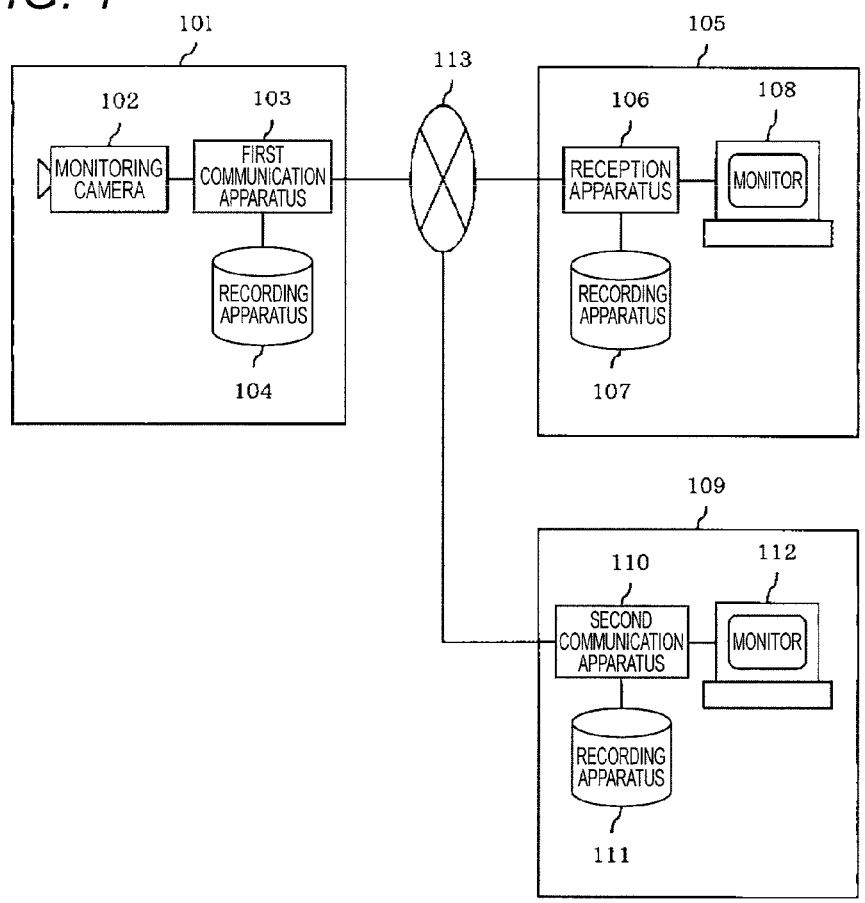
FIG. 1 is a schematic diagram illustrating the entire configuration of a monitoring camera system according to Embodiment 1 of the present invention.

The configuration of a monitoring camera system will be described with reference to FIG. 1. FIG. 1 is a schematic diagram illustrating the entire configuration of a monitoring camera system according to Embodiment 1 of the present invention.

FIG. 1 shows an image system 101. The imaging system 101 includes is a monitoring camera 102, a first communication apparatus 103, and a recording apparatus 104, which are connected to each other by an internal network (such as a LAN).

FIG. 1 also shows a reproduction system 105. The reproduction system 105 includes a reception apparatus 106, a recording apparatus 107, and a monitor 108, which are connected to a separate internal network from the imaging system 101.

FIG. 1 also shows a restoration system 109. The restoration system 109 includes a second communication apparatus 110, a recording apparatus 111, and a monitor 112. The restoration system 109 is also connected to a separate internal network from the imaging system 101.

In addition, the imaging system 101, the reproduction system 105, and the restoration system 109 are externally connected to each other through a network 113.

The imaging system 101 creates a privacy-protected image and data for restoration from an image obtained in the monitoring camera 102, and transmits the privacy-protected image to the reproduction system 105 or the restoration system 109 through the network 113. In addition, the data for restoration is recorded in the recording apparatus 104 which is internally connected.

Here, since the imaging system 101 is constructed in a specific internal network, it is possible to suppress access to the reproduction system 105 or the like from the outside through the network 113, and to protect the privacy of the image obtained in the monitoring camera 102.

Meanwhile, when privacy is secured even outside the imaging system 101, the data for restoration may be recorded in locations other than the recording apparatus 104.

The reproduction system 105 receives the privacy-protected image in a reception apparatus 106, and reproduces the received image on a monitor 108. Since the privacy of the image data is protected, not all the details of the image can be confirmed during reproduction. In addition, the privacy-protected image is recorded, as necessary, in a recording apparatus 107 which is internally connected. Meanwhile, this system is a system used by a general user who does not need privacy information.

The restoration system 109 receives the privacy-protected image in a second communication apparatus 110, and reproduces the received image on a monitor 112. The image data is configured such that not all the details of the image can be confirmed as described above. In addition, the privacy-protected image is recorded in a recording apparatus 111 which is internally connected.

In addition, when a need to confirm the details of the image occurs, data for restoration in the second communication apparatus 110 is received from the imaging system 101, an original image is restored using the privacy-protected image recorded in the recording apparatus 111 and the data for restoration, and the restored image is reproduced on the monitor 112. Since a privacy-protected portion of this image is restored, all the details of the original image can be confirmed. Such a system is a system used by an administrator because the details of the image containing privacy information can be confirmed when necessary.

Meanwhile, in the present embodiment, the reproduction system 105 and the restoration system 109 are described separately, but may be realized by the same system. In this case, a use right of the restoration system 109 may be set for each user using, for example, a login ID or the like.

Figure 2:
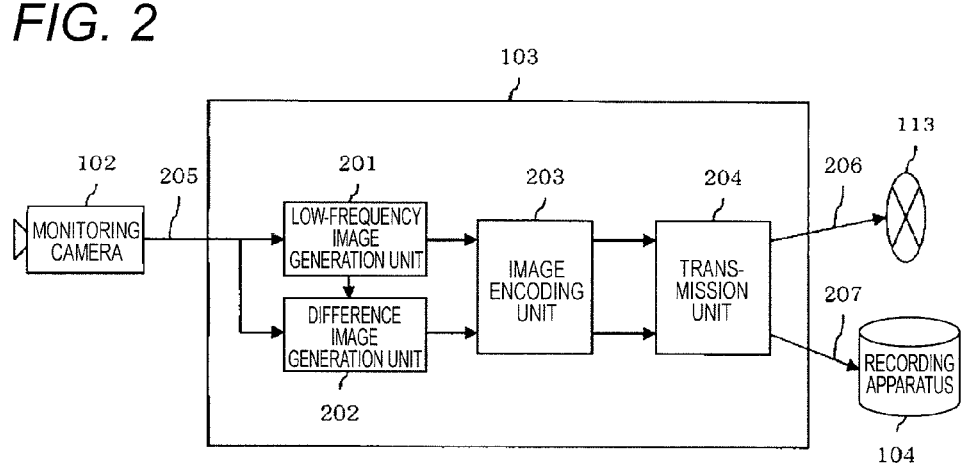
FIG. 2 is a block diagram of a first communication apparatus according to Embodiment 1 of the present invention.
Figure 3:
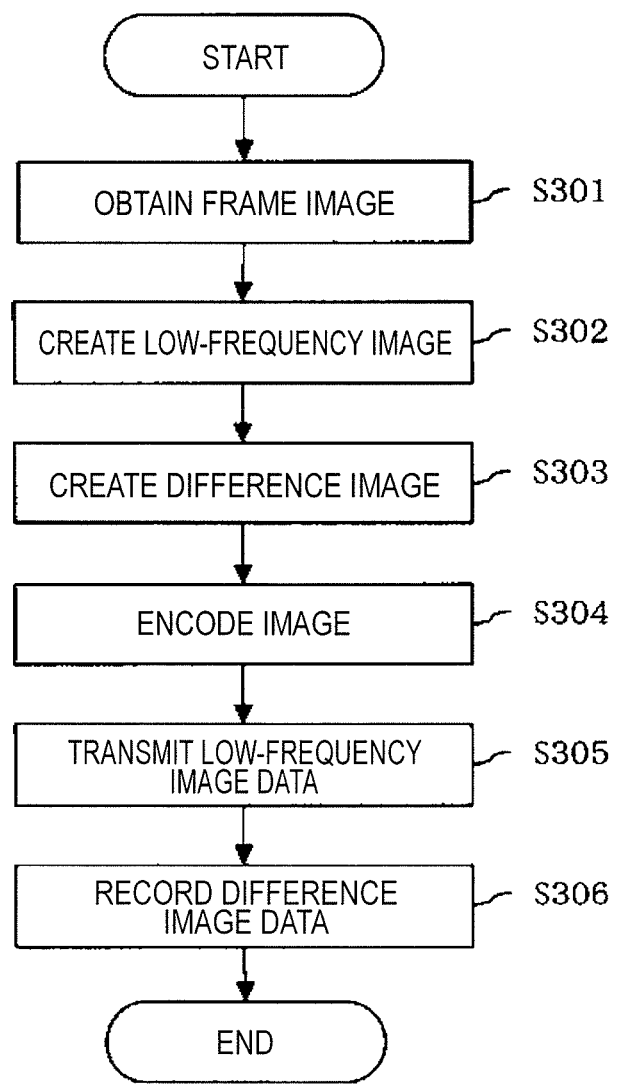
FIG. 3 is a flowchart of processing in the first communication apparatus according to Embodiment 1 of the present invention.

Next, the first communication apparatus 103 will be described in detail with reference to FIGS. 2 and 3. FIG. 2 is a block diagram of a first communication apparatus according to Embodiment 1 of the present invention, and FIG. 3 is a flowchart of processing in the first communication apparatus according to Embodiment 1 of the present invention.

FIG. 2 illustrates a low-frequency image generation unit 201, a difference image generation unit 202, an image encoding unit 203, a transmission unit 204, a frame image 205, low-frequency image encoded data 206, and a difference image encoded data 207.

Hereinafter, the flow of processing will be described with reference to the flowchart of FIG. 3.

First, the monitoring camera 102 forms an image of an optical signal in the vicinity of a camera onto an image sensor using a lens and converts the resultant signal into an electric signal, to obtain the frame image 205 as digital data (S301).

The low-frequency image generation unit 201 then creates a low-frequency image from the frame image 205 (S302).

Further, the difference image generation unit 202 creates a difference image between the frame image 205 obtained in the monitoring camera 102 and the low-frequency image created in the low-frequency image generation unit 201 (S303).

The image encoding unit 203 encodes the low-frequency image created in the low-frequency image generation unit 201 and the difference image created in the difference image generation unit 202 (S304).

The transmission unit 204 transmits the low-frequency image encoded data 206 encoded in the image encoding unit 203 to the reproduction system 105 or the restoration system 109 through the network 113 (S305). In addition, the difference image encoded data 207 encoded in the image encoding unit 203 is recorded in the recording apparatus 104 (S306).

Figure 4:
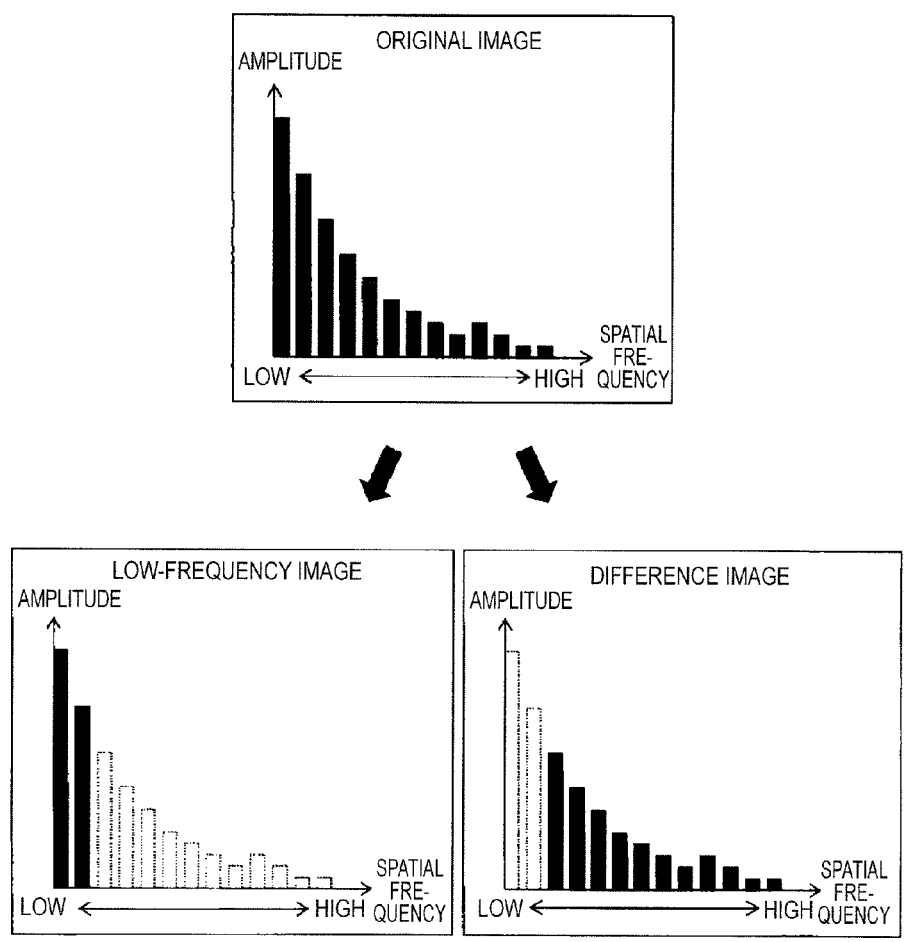
FIG. 4 is a diagram illustrating spatial frequency components contained in an original image, a low-frequency image, and a difference image.

Here, before each configuration block is described, the low-frequency image and the difference image will be described below. FIG. 4 shows graphs illustrating spatial frequency components in the original image, the low-frequency image, and the difference image.

As shown in FIG. 4, where a horizontal axis is set to a spatial frequency and a vertical axis is set to an amplitude by performing conversion in a certain image (original image), the low-frequency image refers to an image obtained by extracting a component having a low spatial frequency among the spatial frequency components contained in the original image.

On the other hand, the difference image is an image containing remaining frequency components except for a spatial frequency component contained in the low-frequency image among the spatial frequency components of the original image.

Since the low-frequency image is obtained by extracting the low-frequency component as stated above, the image becomes an image, out of focus or mosaic-processed, of which the details cannot be confirmed, without including detailed portions of the image such as a profile expressed by a component having a high spatial frequency.

Therefore, the low-frequency image becomes a privacy-protected image because the general situation of locations captured by a camera can be ascertained, whereas the details of the image cannot be confirmed.

On the other hand, the difference image contains a high spatial frequency, and thus becomes an image in which the detailed situation of a profile or the like can be confirmed. Thus, the difference image becomes an image in which privacy information such as a person, a vehicle type, and a vehicle can be specified from the profiles or the like of a face, a vehicle, and a license plate.

Hereinafter, each configuration block will be described below in detail.

The low-frequency image generation unit 201 creates a low-frequency image from the frame image. The low-frequency image can be created by once converting an image into a spatial frequency domain, and extracting a component having a low spatial frequency. The low-frequency image can be created by performing frequency transformation such as, for example, Fourier transformation, discrete cosine transformation, or wavelet transformation, extracting a component having a low spatial frequency, and performing inverse transformation.

Meanwhile, since the conversion to a spatial frequency domain causes a large load on a CPU (Central Processing Unit), a device having a certain level of processing capability is required to be used, but the conversion can be performed more simply.

For example, when a filtering process or block averaging is performed on a real space, the details of an image become unknown, and only the general situation becomes known.

That is, the averaging causes a reduction in the component having a high spatial frequency in the image. Therefore, even when the conversion to a spatial frequency is not performed, it is possible to create a low-frequency image for which it is not possible to be aware of the details of the image, and to create an image which is capable of sufficiently protecting privacy.

Therefore, it is possible to create a low-frequency image without requiring the conversion to a spatial frequency, and to reduce a load.

Figures 5A, 5B, 6:
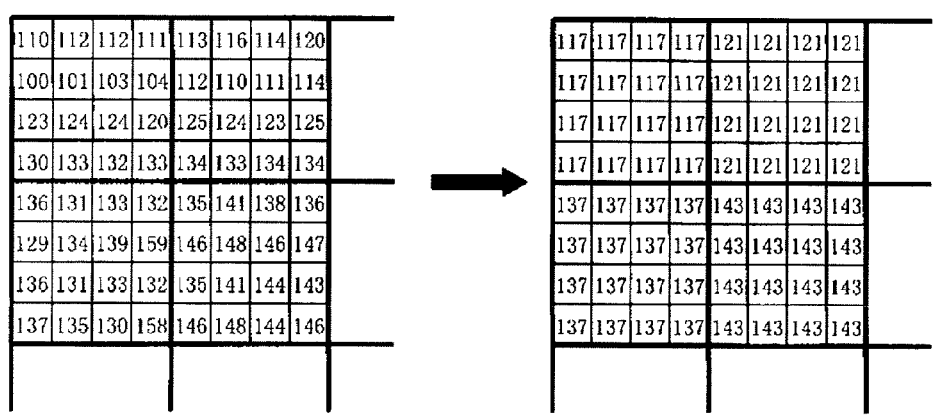
FIGS. 5A and 5B are diagrams illustrating a smoothing filter.
FIG. 6 is a diagram illustrating a block average.

Hereinafter, each creation method will be described below with reference to FIGS. 5A, 5B and 6. FIG. 5A is a diagram illustrating a smoothing filter based on a moving average, and FIG. 5B is a diagram illustrating a smoothing filter based on a weighted average.

Specifically, when a smoothing filter of nine pixels shown in FIGS. 5A and 5B is used, the sum of a target pixel and eight pixels in the vicinity thereof is divided centering on a pixel targeted for smoothing to thereby perform smoothing of the target pixel, and such a process is performed on all the pixels.

In this case, in FIG. 5A, the average of the target pixel and eight pixels in the vicinity thereof is simply set to a pixel after smoothing, but in FIG. 5B, weighting is performed on the pixel after smoothing in advance so that the influence of the target pixel becomes large, and then the pixel after smoothing is calculated.

Meanwhile, in the example of FIGS. 5A and 5B, smoothing is performed using nine pixels, but the number of pixels used is not limited thereto. It is possible to adjust a blurring condition by changing the number of neighboring pixels or coefficient values which are used in smoothing. In addition, when image data is constituted by a plurality of planes such as RGB, these processes have to be performed on each of the planes (R, G, and B).

FIG. 6 is a diagram illustrating a block average. In the block average, unlike the above-mentioned smoothing filter, the above process is not performed on each of the pixels, but the image is divided into blocks of 4×4 pixels, and the value of each pixel is replaced by an average value of blocks, thereby allowing a low-frequency image averaged for each block to be created.

In a case of a block of upper-left 4×4 pixels in FIG. 6, the average value of sixteen pixels contained in the block is equal to 117, and thus the value of each pixel is replaced by 117. The same process is repeated for each block, thereby allowing a low-frequency image based on the block average to be created.

In addition, the image data has high correlation between neighboring pixels, and the values of adjacent pixels are often close to each other. Therefore, even when the average values of all the pixels contained in the blocks are not obtained at the time of performing the block average, the average value of a portion of the pixels may be substituted as the average value of the blocks. This allows a process in which a load is lighter to be realized.

In addition, it is possible to adjust the strength of a mosaic by changing a block size. As the block size becomes larger, the strength of privacy protection increases. When the image data is constituted by a plurality of planes even in a case where the low-frequency image is created using the block average, these processes are required to be performed on the respective planes.

Figure 7A:
FIGS. 7A and 7B are diagrams illustrating a low-frequency image.
Figure 7B:

FIGS. 7A and 7B illustrate an example of a low-frequency image created using the filtering process or the block average. FIG. 7A is a diagram illustrating a low-frequency image using the smoothing filter, and FIG. 7B is a diagram illustrating a low-frequency image using the block average. In this manner, even when the filtering process or the block average is used on a real space, it is possible to create a low-frequency image in which privacy is protected.

The difference image generation unit 202 creates a difference image between a frame image and a low-frequency image. The difference image is data containing a component having a high spatial frequency for which it is possible to be aware of the details of the image, and is an image relating to privacy.

Such a difference image serves as data for restoring an original frame image (image including privacy) by synthesis with the low-frequency image.

The difference image is obtained by subtracting pixel values to which the frame image and the low-frequency image correspond. Here, when the frame image obtained in the monitoring camera 102 is 8-bit data, the value of each pixel is in a range of 0 to 255. On the other hand, the value of the difference image obtained by subtracting the pixel value corresponds to 9-bit data in a range of −255 to 255, and a range capable of being taken by the data value increases.

Figure 8:
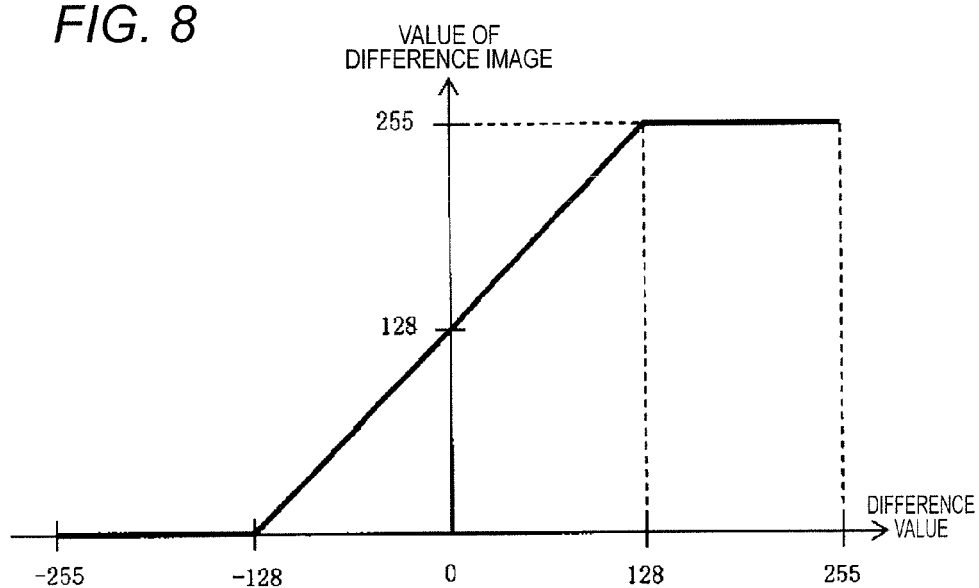
FIG. 8 is a graph illustrating a method of converting a difference value of the difference image.

Consequently, conversion to 8-bit data is performed using conversion as shown in FIG. 8. In FIG. 8, a horizontal axis represents a difference value (value of the difference image) between the frame image and the low-frequency image, and a vertical axis represents a value of the difference image after conversion. As shown in FIG. 8, an offset of 128 is added to the value of the difference image, the value of 0 or less is clipped to 0, and the value of 255 or greater is clipped to 255, to thereby convert the values of −255 to 255 into 8-bit data in a range of 0 to 255.

As a method of conversion to 8-bit data, a method of quantizing the entire range of data linearly or non-linearly may be used in addition to such clipping. In addition, in order to increase an SN ratio of a restoration image during restoration with respect to the frame image, difference data may be held in a state of 9-bit data.

The image encoding unit 203 encodes the low-frequency image and the difference image. In the present embodiment, since a moving image captured by the monitoring camera is used as a target, MPEG, H.264/AVC or the like which is a compression standard is considered as an image encoding method. In addition, when a still image is used as a target, JPEG, JPEG2000 or the like can also be applied thereto.

The image encoding method is preferably a standard method from the viewpoint of processing speed, encoding efficiency, or general purposes, but is not limited to the standard method. As long as a format capable of being reproduced in the reproduction system or the restoration system is used in the monitoring camera system, its own encoding method may be used.

In addition, in the present embodiment, although both the low-frequency image and the difference image are encoded, a configuration in which only the low-frequency image is encoded or a configuration in which any of the low-frequency image and the difference image are not encoded is also considered depending on a processing speed of encoding, a writing speed to a storage device, a transmission speed of a network, and the trade-off of cost or the like involved in the storage device. When the encoding is not performed, the image data has a non-compression format. In this case, the image data having a non-compression format has to be displayed and reproduced by the reproduction system or the restoration system within the monitoring camera system.

Meanwhile, in the present invention, the low-frequency image is used as an image for protecting privacy, and the difference image is use as data for restoration. As described with reference to FIG. 4, the low-frequency image is an image obtained by extracting a component having a low spatial frequency from the spatial frequency component contained in the original image, and the difference image is an image containing remaining frequency components except for the spatial frequency component contained in the low-frequency image.

However, when privacy protection is intended, complete division into a low-frequency component and a high-frequency component from a certain spatial frequency is not required as shown in FIG. 4. When most of the component having a low spatial frequency is contained in the low-frequency image and most of the component having a high spatial frequency is not contained therein, the privacy can be protected just using the filtering process or the block average, as described above, because the profile becomes unknown.

On the other hand, as a method of creating a privacy-protected image, other methods such as a method or the like of superimposing noise on, for example, a frame image in addition to the low-frequency image are also considered. Even when noise is superimposed, privacy is protected in a noise image.

However, when such a method is used, the frequency characteristic itself is changed in the noise image or the difference image between the original image and the noise image. That is, since noise contains large amounts of components having a high spatial frequency, the amplitude of the high-frequency component of the noise image or the difference image is significantly different from that of the original image.

Here, image encoding performed in a subsequent stage is considered. In many image encoding methods such as a standard compression method, frequency transformation such as discrete cosine transformation or wavelet transformation is performed, and a different process is performed for each frequency. Specifically, since the visual feature of a person is insensitive to a high frequency, in order to reduce the amount of information, the component having a high spatial frequency is quantized more coarsely than the component having a low spatial frequency. Therefore, when the component having a high spatial frequency such as noise is superimposed and encoded, a quantization error increases, and thus it is difficult to successfully remove the superimposed noise during restoration.

In addition, when the component having a high spatial frequency, such as noise, which is not contained in a normal natural image is superimposed on an image, the high-frequency component which is not originally generated is required to be held as encoded data, and thus there is also a problem in that encoding efficiency considerably decreases.

Consequently, as described in the present invention, these problems can be solved by separating the spatial frequency component of the original image into two images.

That is, with such a configuration in which the component is separated into the low-frequency image and the difference image and the respective images are individually encoded, the image quality of a restoration image synthesized after decoding is not greatly deteriorated as compared to the original image. In addition, the sum of the respective amounts of data which are individually encoded does not increase that much as compared to a case where the original image is encoded.

Therefore, with such a configuration, it is possible to confirm the outline of an image without restoring the image while protecting privacy with the amount of data almost as much as that of the related art, and to realize a monitoring camera system capable of restoring the details of the image in case of emergency.

Figure 9:
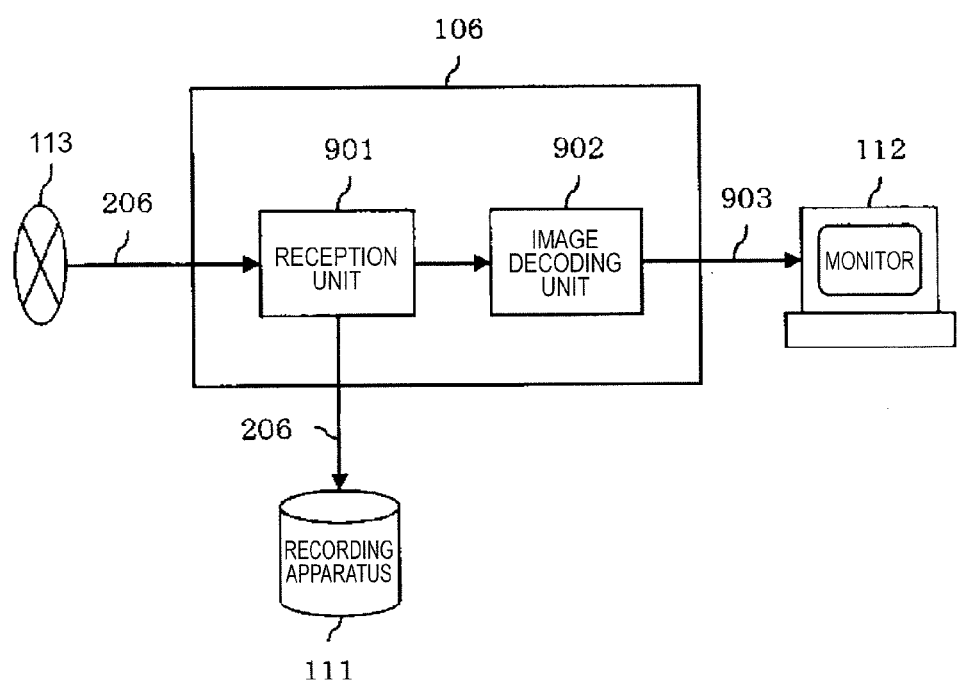
FIG. 9 is a block diagram of a reception apparatus of the related art.

Next, the reception apparatus 106 will be described below with reference to FIG. 9. FIG. 9 illustrates a block diagram of a reception apparatus of the related art.

FIG. 9 illustrates a reception unit 901, an image decoding unit 902, a low-frequency image encoded data 206, and a low-frequency image data 903. The reception apparatus 106 is used to receive and reproduce a privacy-protected low-frequency image. The reception unit 901 receives the low-frequency image encoded data 206. In addition, when reproduction is required afterward, the low-frequency image encoded data 206 is recorded in a recording apparatus 111 which is internally connected. The image decoding unit 902 decodes the low-frequency image encoded data 206. A monitor 112 displays and reproduces the obtained low-frequency image data 903. The low-frequency image encoded data 206 is data encoded in the image encoding unit 203 of the first communication apparatus 103, and thus the image decoding unit 902 needs to decode the data. When the image encoding unit 203 is a standard compression scheme, the image decoding unit 902 may decode the encoded data in a standard scheme. When the image encoding unit 203 has its own encoding scheme, the image decoding unit 902 has also its own decoding scheme corresponding thereto.

Next, processes of the second communication apparatus 110 will be described in detail. The second communication apparatus 110 can perform the same reproduction processing as that of the reception apparatus 106, and restoration processing which cannot be performed by the reception apparatus 106.

Figure 10:
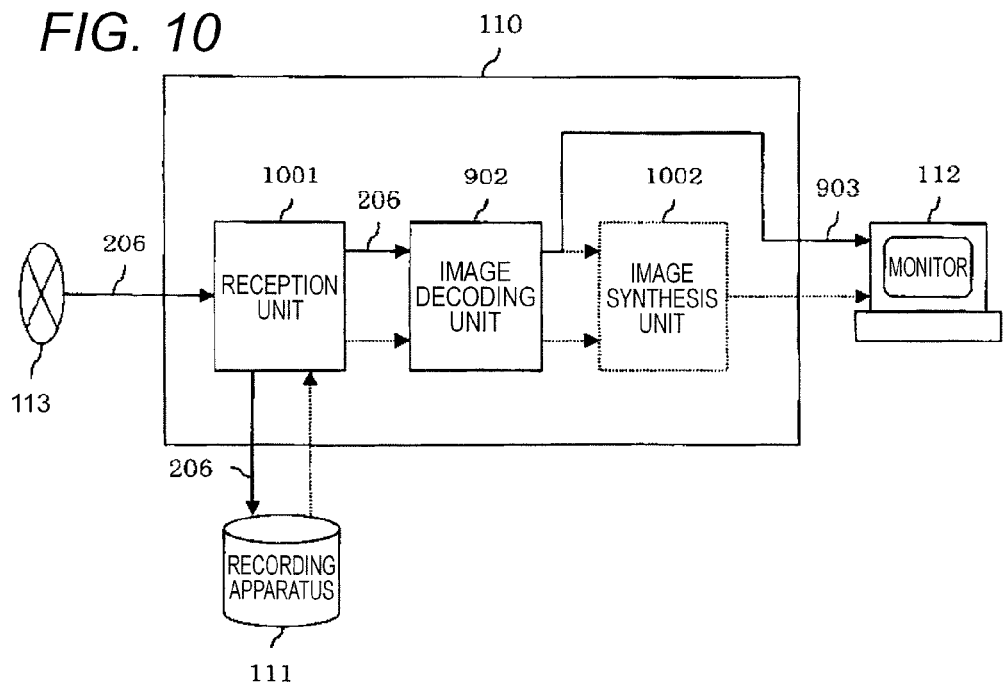
FIG. 10 is a block diagram of a second communication apparatus according to Embodiment 1 of the present invention during reproduction.
Figure 11:
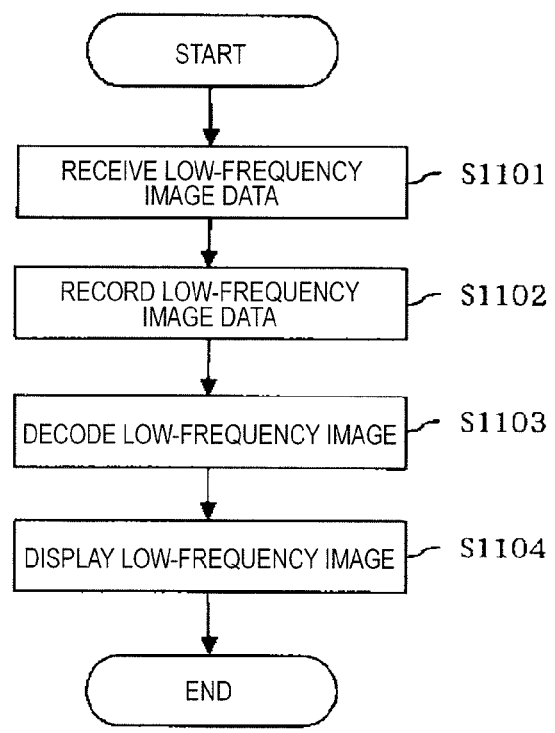
FIG. 11 is a flowchart of reproduction processing in the second communication apparatus according to Embodiment 1 the present invention.

First, the reproduction processing of the second communication apparatus 110 will be described in detail with reference to FIGS. 10 and 11. FIG. 10 is a block diagram of the second communication apparatus according to Embodiment 1 of the present invention during reproduction, and FIG. 11 is a flowchart of the reproduction processing in the second communication apparatus according to Embodiment 1 of the present invention.

FIG. 10 illustrates a reception unit 1001, an image decoding unit 902, an image synthesis unit 1002 that synthesizes a decoded low-frequency image and a difference image, a low-frequency image encoded data 206, and a low-frequency image data 903.

Hereinafter, a flow of processing will be described with reference to a flowchart of FIG. 11.

First, the reception unit 1001 receives the low-frequency image encoded data 206 from the imaging system 101 through the network 113 (S1101).

Next, the reception unit 1001 records the received low-frequency image encoded data 206 in the recording apparatus 111 (S1102). In this case, information for specifying difference image encoded data which is required for the restoration of an image is also recorded together. Specifically, a file name of the difference image encoded data or a recorded location (such as a file path) which corresponds to the received low-frequency image encoded data is managed and recorded using a table or the like.

The image decoding unit 902 decodes the low-frequency image encoded data 206, and creates the low-frequency image data 903 of one frame (S1103).

Finally, the monitor 112 displays the low-frequency image data 903 which is a created frame image (S1104).

Since the low-frequency image data is merely decoded during normal reproduction, not all the details of the image can be confirmed just by displaying a privacy-protected image. In addition, the low-frequency image encoded data 206 is required even during restoration, and thus is recorded in the recording apparatus 111.

Figure 12:
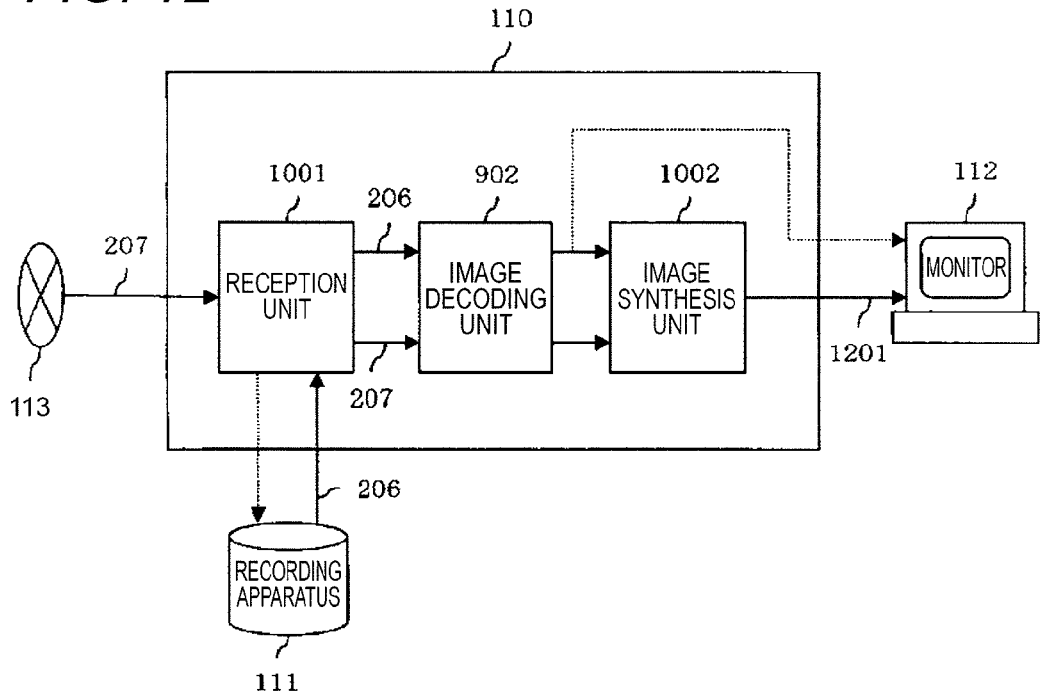
FIG. 12 is a block diagram of the second communication apparatus according to Embodiment 1 of the present invention during restoration.
Figure 13:
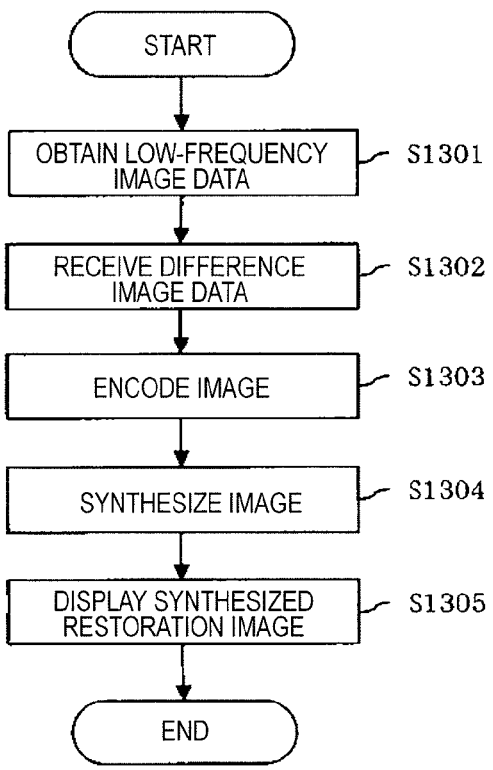
FIG. 13 is a flowchart of restoration processing in the second communication apparatus according to Embodiment 1 of the present invention.

Next, restoration processing of the second communication apparatus 110 will be described in detail with reference to FIGS. 12 and 13. FIG. 12 is a block diagram of the second communication apparatus according to Embodiment 1 of the present invention during restoration, and FIG. 13 is a flowchart of restoration processing in the second communication apparatus according to Embodiment 1 of the present invention.

FIG. 12 illustrates a reception unit 1001, an image decoding unit 902, an image synthesis unit 1002 that synthesizes a decoded low-frequency image and a difference image, a low-frequency image encoded data 206, a difference image encoded data 207, and restoration image data 1201.

Hereinafter, a flow of processing will be described with reference to a flowchart of FIG. 13.

First, the reception unit 1001 obtains the low-frequency image encoded data 206 recorded in the recording apparatus 111 (S1301).

Next, the reception unit 1001 receives the difference image encoded data 207 from the imaging system 101 through the network 113 (S1302). Specifically, the reception unit receives difference image encoded data corresponding to the low-frequency image encoded data 206 desired to be restored. The corresponding difference image encoded data can be specified from the file name or the recorded location (such as a file path) which is managed and recorded in the table or the like described in the reproduction processing.

The image decoding unit 902 decodes the low-frequency image encoded data 206 and the difference image encoded data 207, and creates data of the low-frequency image and the difference image of one frame (S1303).

The image synthesis unit 1002 synthesizes the low-frequency image and the difference image, and creates the restoration image 1201 (S1304).

Finally, the monitor 112 displays the restoration image data 1201 which is a created frame image (S1305).

Hereinafter, the image synthesis unit 1002 will be described in detail.

Figure 14:
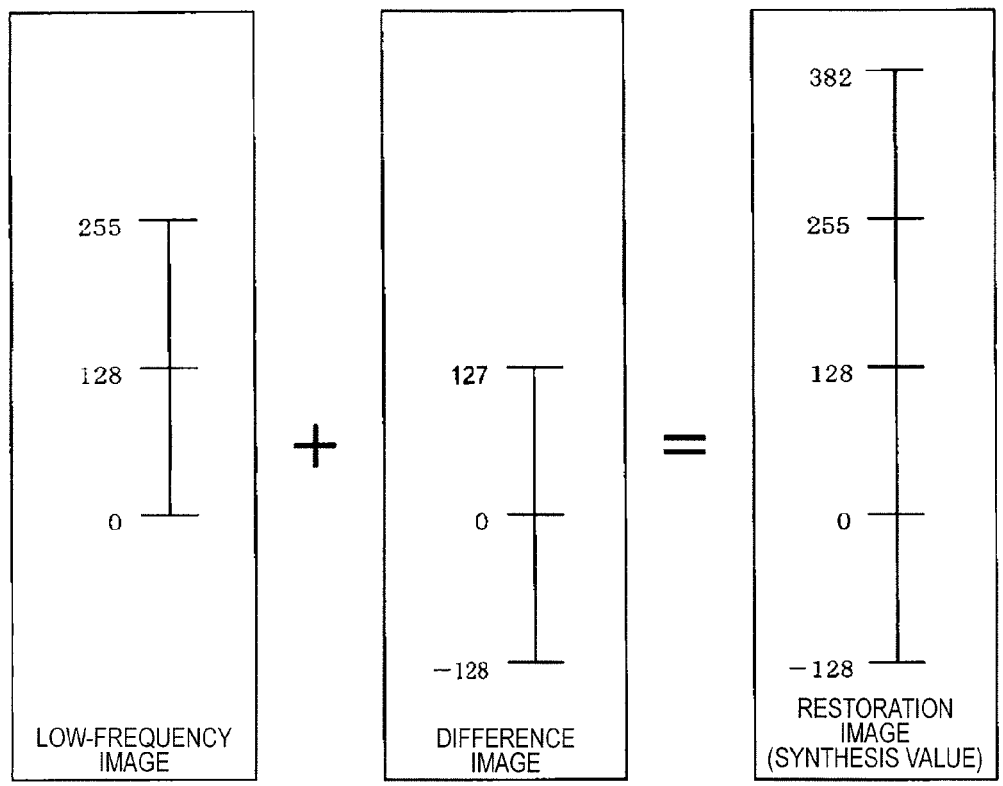
FIG. 14 is a diagram illustrating the creation of a restoration image by an image synthesis.

The image synthesis unit 1002 synthesizes the decoded low-frequency image and the difference image, and creates a restoration image. FIG. 14 is a diagram illustrating the creation of the restoration image by an image synthesis. In the difference image, an offset of 128 is added to a real difference value in the difference image generation unit 202 of the first communication apparatus 103. Therefore, the synthesis value of a restoration image is created by subtracting the offset from the pixel value of the difference image, performing a change to a value of −128 to 127, and adding the changed value to a corresponding value of the low-frequency image.

Figure 15:
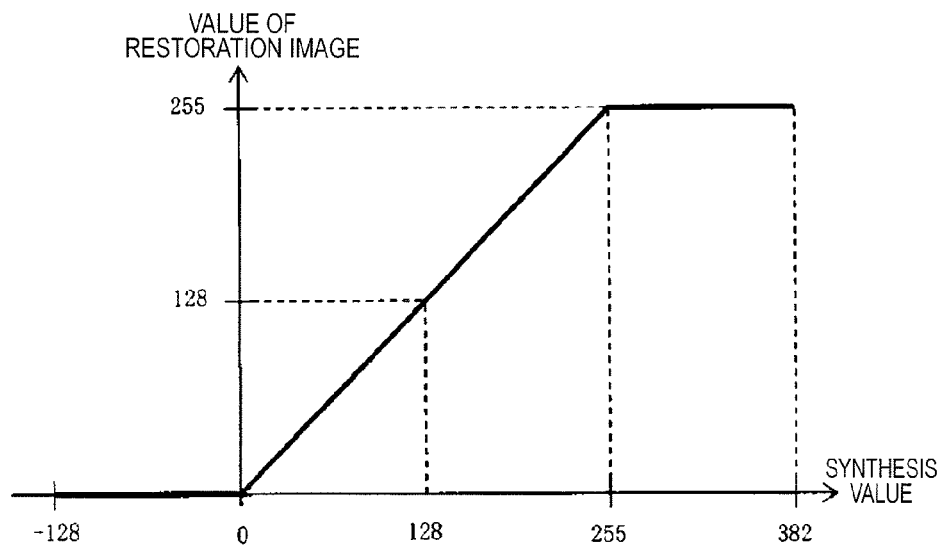
FIG. 15 is a graph illustrating a method of converting a synthesis value of the restoration image.

However, since the low-frequency image and the difference image are separately encoded, the added synthesis value of the restoration image may not fall within a range of 0 to 255 due to a quantization error. Consequently, the value of the restoration image is converted into 8-bit data using a conversion as shown in FIG. 15. In FIG. 15, a horizontal axis represents a value obtained by synthesizing the low-frequency image and the difference image for the purpose of restoration, and a vertical axis represents a value of the restoration image after the synthesis value is converted. The value of 0 or less is clipped to 0, and the value of 255 or greater is clipped to 255, to thereby convert the value of the restoration image into 8-bit data.

With such a configuration as described above, it is possible to confirm the outline of an image without restoring the image while protecting privacy with the amount of data almost as much as that of the related art, and to realize a monitoring camera system capable of restoring the details of the image in case of emergency. In addition, since a system can be formed using the standard image encoding unit and the image decoding unit, it is possible to realize a versatile monitoring camera system which is simple and inexpensive.

Meanwhile, in the present embodiment, although a description is given in which the image which is input from the monitoring camera 102 is used as a target, it goes without saying that the present invention is also applied to image data obtained from other than the monitoring camera 102, or image data stored in advance.

In addition, regarding the image in the present embodiment, a frame image received from the monitoring camera 102 is also not required to be digital data regardless of a moving image and a still image, and may be analog data. Meanwhile, in this case, the image is changed to digital data, and divided into the low-frequency image and the difference image.

In addition, in the present embodiment, the imaging system 101 is configured such that the monitoring camera 102, the first communication apparatus 103, and the recording apparatus 104 are connected to each other by an internal network. However, even when some or all of these components are realized within the monitoring camera 102, it goes without saying that the present invention can be applied.

In addition, in the present embodiment, the restoration system 109 is configured such that the second communication apparatus 110, the recording apparatus 111, and the monitor 112 are connected to each other by an internal network, but these components may be constituted by a personal computer, a monitor and the like.

In addition, as the privacy-protected image, the low-frequency component of a spatial frequency is used, but all the low-frequency components may not be contained.

In addition, in the present embodiment, the low-frequency component of a spatial frequency is used as the privacy-protected image. However, as long as the details of an original frame image are not visible even when a frequency component of a portion of the spatial frequency (for example, intermediate frequency component when the frequency is divided into three of a low frequency, an intermediate frequency, and a high frequency) is extracted, an intermediate frequency component may be used as the privacy-protected image.

Hereinbefore, the description gives an example in which the low-frequency image is generated from the image data, and transmitted along with the difference image to restore the original image. However, if it is not necessary to restore the original message at the reception apparatus, the low-frequency image is not always generated or transmitted. In this case, the first communication apparatus 103 may include a partial image data generation unit to generate partial image data by extracting a partial component from image data instead of including the low-frequency image generation unit 201 and the difference image generation unit 202, and may be configured to transmit the partial image data.

Embodiment 2

Hereinafter, Embodiment 2 of the present invention will be described with reference to the accompanying drawings. Meanwhile, components having the same functions as those in Embodiment 1 are denoted by the same reference numerals and signs, and thus the description thereof will not be given.

Figure 16:
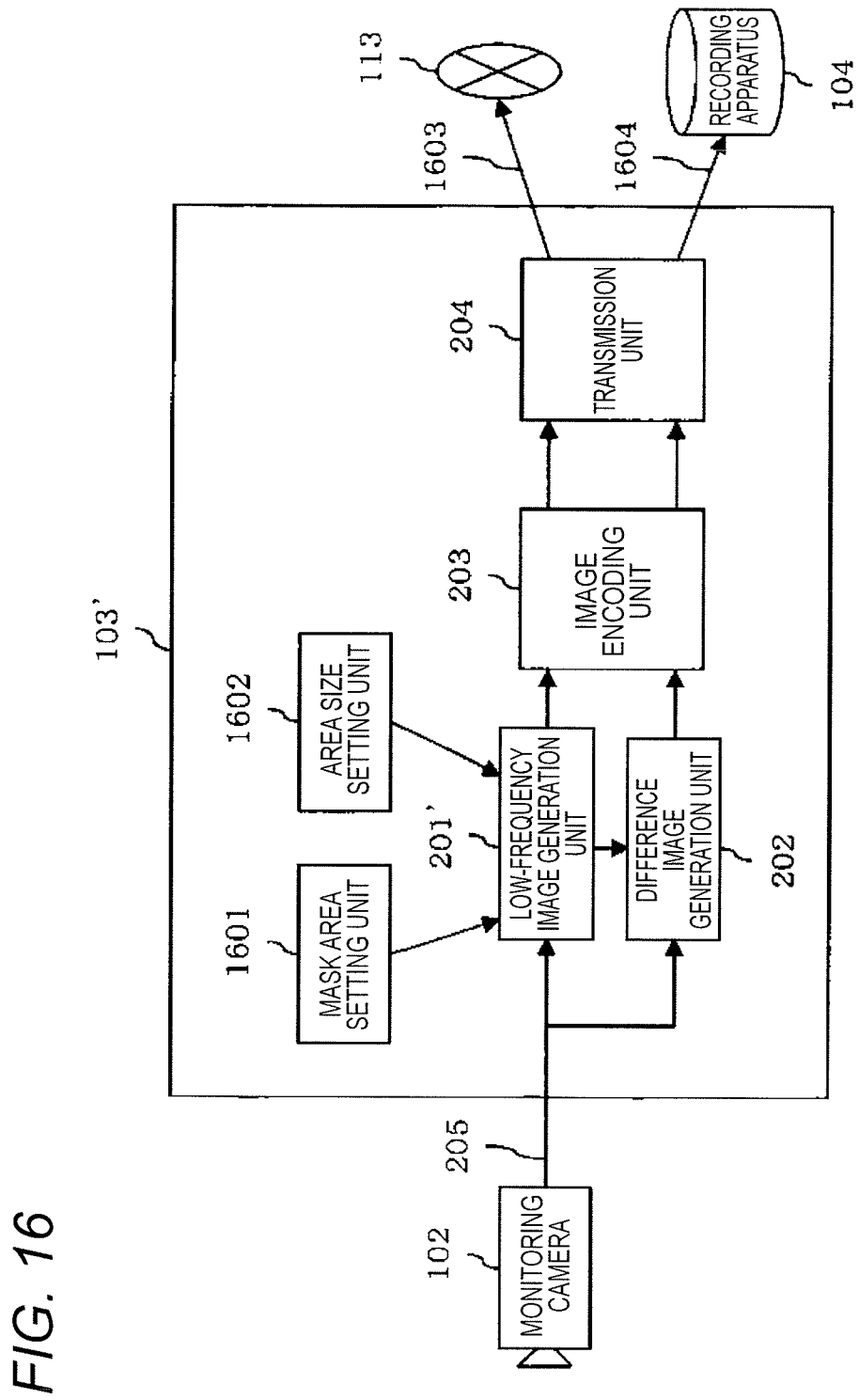
FIG. 16 is a block diagram of a first communication apparatus according to Embodiment 2 of the present invention.
Figure 17:
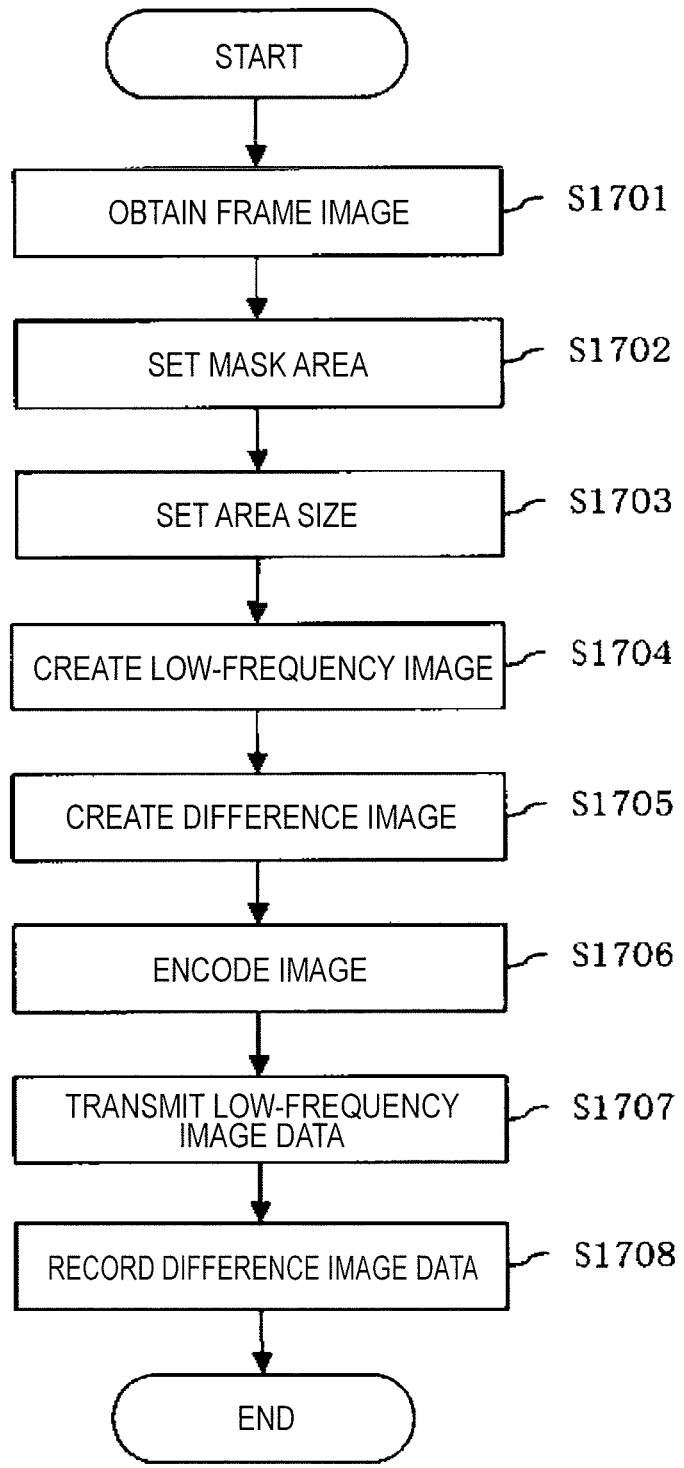
FIG. 17 is a flowchart of processing in the first communication apparatus according to Embodiment 2 of the present invention.

FIG. 16 is a block diagram of a first communication apparatus according to Embodiment 2 of the present invention, and FIG. 17 is a flowchart of processing in the first communication apparatus according to Embodiment 2 of the present invention.

FIG. 16 illustrates a mask region setting unit 1601 that sets a region targeted for the creation of the low-frequency image as a mask region, a region size setting unit 1602 that sets the size of a predetermined region used in the generation of the low-frequency image, a low-frequency image generation unit 201' that creates the low-frequency image using an average of pixels of the predetermined region, low-frequency image encoded data 1603, and difference image encoded data 1604.

Hereinafter, a flow of processing will be described with reference to a flowchart of FIG. 17.

First, the monitoring camera 102 forms an image of an optical signal in the vicinity of a camera onto an image sensor using a lens and converts the resultant signal into an electric signal, to obtain the frame image 205 as digital data (S1701).

Next, the mask region setting unit 1601 sets a mask region as a region for protecting privacy (S1702). Since only the mask region is converted into the low-frequency image, the image details of the mask region cannot be confirmed.

Further, the region size setting unit 1602 sets the size of a predetermined region (region size) used when the low-frequency image is created (S1703).

The low-frequency image generation unit 201' creates a low-frequency image from a frame image using the set region size with respect to the set mask region (S1704). The low-frequency image is created using a block average for calculating an average value for each pixel within the set region size.

Further, the difference image generation unit 202 creates a difference image between the frame image obtained in the monitoring camera 102 and the low-frequency image created in the low-frequency image generation unit 201' (S1705).

The image encoding unit 203 encodes the low-frequency image created in the low-frequency image generation unit 201' and the difference image created in the difference image generation unit 202 (S1706).

The transmission unit 204 transmits the low-frequency image encoded data 1603 encoded in the image encoding unit 203 to the reproduction system 105 or the restoration system 109 through the network 113 (S1707). In addition, the difference image encoded data 1604 encoded in the image encoding unit 203 is recorded in the recording apparatus 104 (S1708).

Hereinafter, each configuration block will be described in detail.

Figure 19A:
FIGS. 19A and 19B are diagrams illustrating a low-frequency image and a difference image.

The low-frequency image generation unit 201' creates a low-frequency image using the average of pixels of the predetermined region. Basic functions are the same as those in a case where the block average in the low-frequency image generation unit 201 described in Embodiment 1 is used, but the low-frequency image generation unit 201' in the present embodiment converts only the region which is set in the mask region setting unit 1601 into the low-frequency image. In addition, a function of obtaining the block average is added with the size of a block which is set in the region size setting unit 1602. Although described later for further details, the low-frequency image created in the low-frequency image generation unit 201' becomes an image as shown in FIG. 19A.

Since the details of the image region relating to privacy cannot be confirmed, the mask region setting unit 1601 sets the mask region as a region for protecting privacy. The low-frequency image generation unit converts only the set mask region into the low-frequency image, and creates a low-frequency image without converting other regions into the captured frame image as it is. FIG. 18 is a diagram illustrating mask region settings.

FIG. 18 illustrates a general frame image 1801, and mask regions 1802 and 1803. FIG. 18 illustrates an example when a detected face region is set as a mask region. Here, a mask region 1802 is set in pixel units, and a mask region 1803 is set in block units. As targets of the mask region relating to privacy, a face, a person, a license plate, a moving object, and the like are considered.

As a method of detecting a target region, a method using object detection through machine learning, a method using object tracking, a method using an optical flow or a background difference, a method using a combination thereof, and the like are considered. When these methods are used, the mask region can be set dynamically for each frame.

Figure 19B:
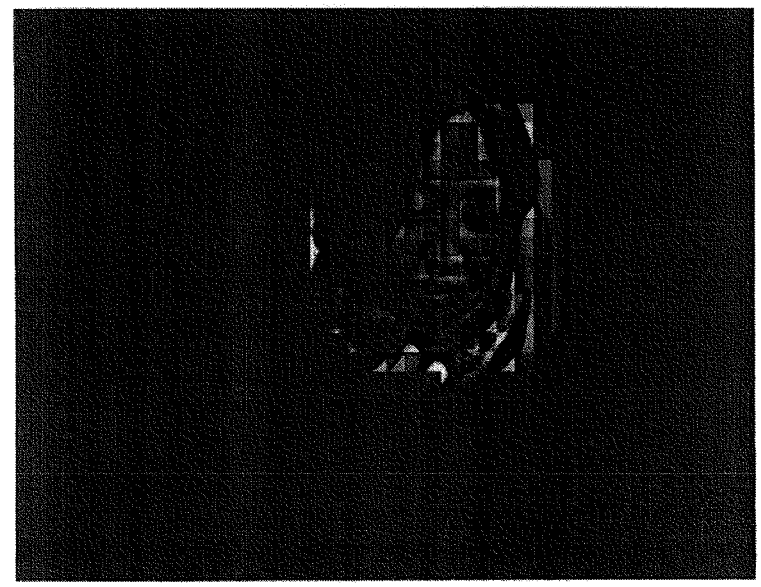

In addition, in a fixed monitoring camera, a position having a tendency for an object such as a person relating to privacy to be projected is often known in advance. In such a case, a method of causing a user to manually set a mask region in advance is also considered. In addition, the number of mask regions is not limited to one. When a plurality of regions relating to privacy are present within an image, a plurality of mask regions can also be set. FIGS. 19A and 19B are diagrams illustrating a low-frequency image and a difference image.

FIG. 19A is a diagram illustrating a low-frequency image when a face portion of a person is set as a mask region. In addition, FIG. 19B is a diagram illustrating a difference image thereof. In the low-frequency image, regions other than the mask region are not converted into a capture frame image as it is. For this reason, when the difference image is created, a difference between the low-frequency image and the frame image does not occur in regions other than the mask region.

That is, the regions other than the mask region in the difference image becomes a certain level of image of a pixel value 128 obtained by adding an offset 128 to a difference value 0. Therefore, even when position information or number information of the set mask region is not stored during restoration, it is possible to restore an original image just by synthesizing the low-frequency image and the difference image as they are. That is, as in the present embodiment, even when the mask region is set by creating the difference image, it is possible to handle the difference image in the same manner as the case of Embodiment 1 in which the entire frame image is converted into the low-frequency image.

Figure 20:
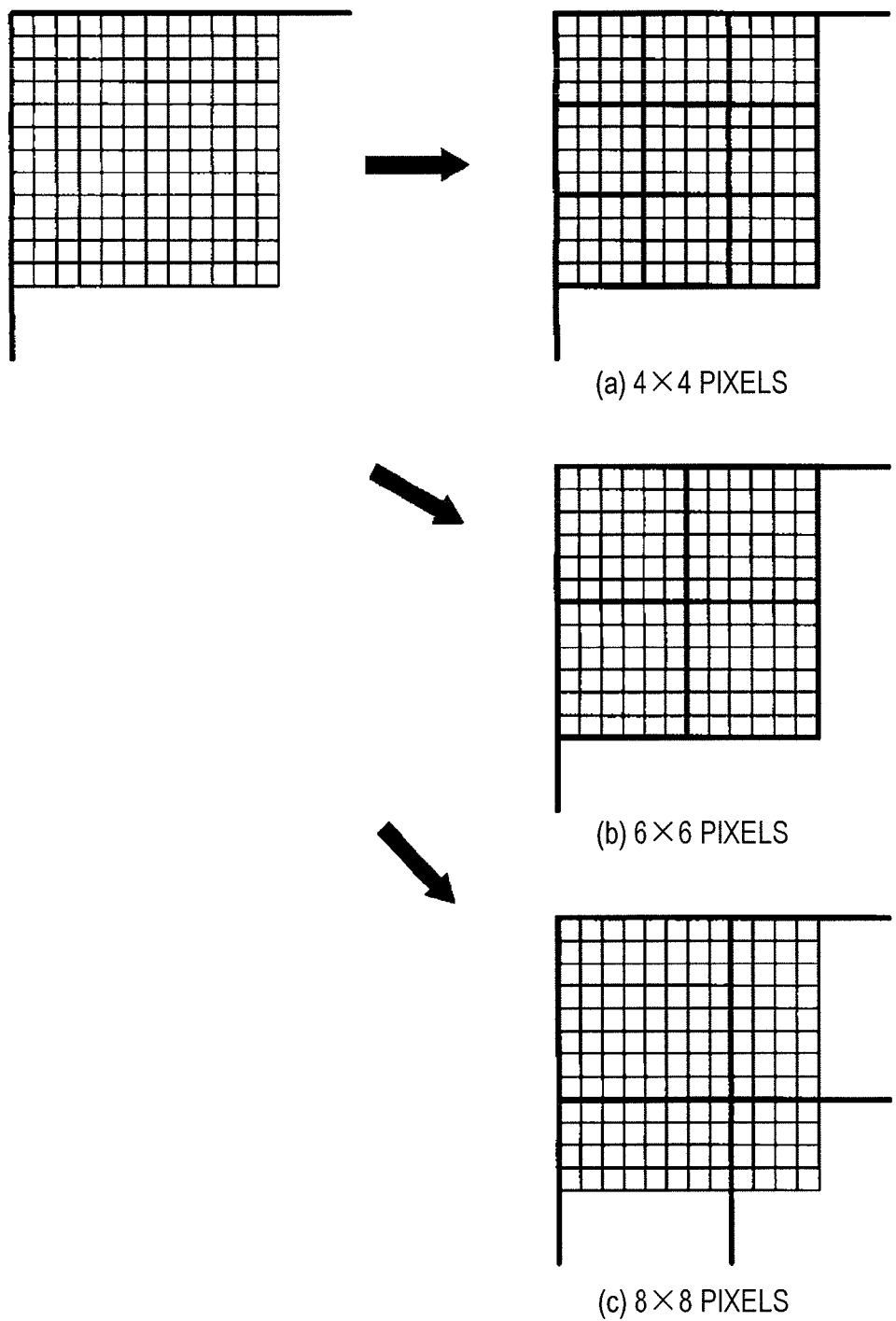
FIG. 20 is a diagram illustrating region size settings.

The region size setting unit 1602 sets the size of a predetermined region for calculating an average of pixels at the time of creating the low-frequency image. FIG. 20 is a diagram illustrating predetermined region size settings. In FIG. 20, (a) illustrates an example in which the predetermined region size is set to 4×4 pixels. In this case, the value of each pixel within a block of 4×4 pixels is set to an average value of pixels within the block, and thus a low-frequency image is created. Similarly, in FIG. 20, (b) is a diagram illustrating 6×6 pixels, and (c) is a diagram illustrating 8×8 pixels.

Making the size of the block large is equivalent to a conversion to a low-resolution image, and thus the amount of information of an image decreases. Therefore, the size of a predetermined region is made to be large when the degree of protecting privacy is desired to be strengthened, and the size of a predetermined region is made to be small when the degree is desired to be weakened, thereby allowing the strength of privacy protection of the low-frequency image to be freely adjusted. Even when the size of the block is arbitrarily adjusted, the fact remains that among the spatial frequency components contained in the frame image, the component having a low spatial frequency is separated into the low-frequency image, and the component having a high spatial frequency is separated into the difference image. For this reason, the encoding efficiency of the image encoding unit performed in a subsequent stage does not considerably decrease.

Figure 21A:
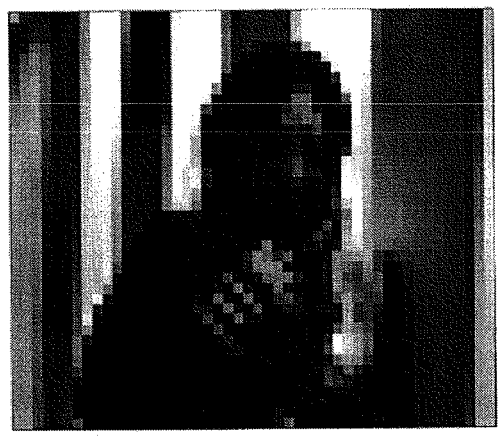
FIGS. 21A, 21B and 21C are diagrams illustrating a block size and an image quality of the low-frequency image.
Figure 21B:
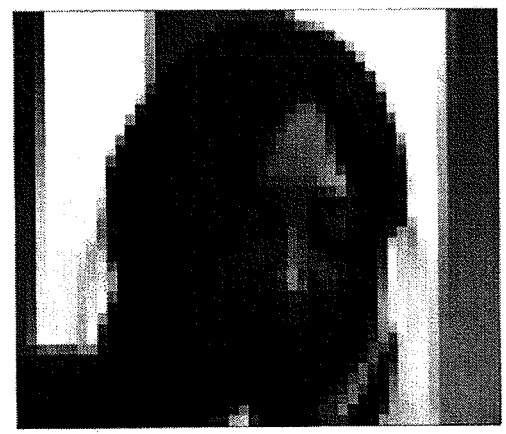
Figure 21C:
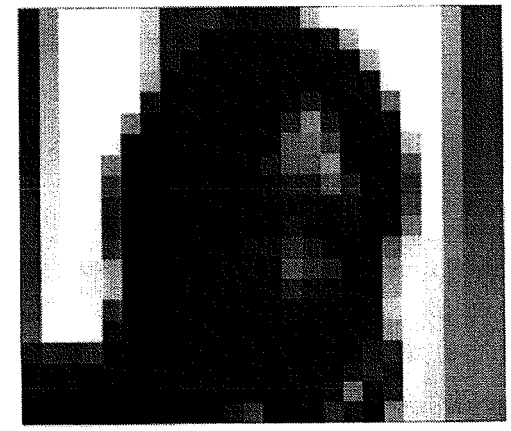

In addition, an object such as a face which is targeted for privacy protection is obtained as an image enlarged as the object approaches a camera. In the enlarged image, even when a low-frequency image is created with the same block size, the effect of privacy protection is not the same. FIGS. 21A, 21B and 21C are diagrams illustrating block sizes and the image quality of a low-frequency image when the low-frequency image is created using a block average.

FIG. 21A and FIG. 21B are examples in which the low-frequency image is created with the block of 8×8 pixels, and FIG. 21C is an example in which the low-frequency image is created with the block of 16×16 pixels.

When FIG. 21A and FIG. 21B are compared with each other, a face region is enlarged in FIG. 21B. Therefore, it turns out that when the low-frequency image is created with the same block size, the effect of privacy protection is low. In a case of such an enlarged image, as shown in FIG. 21C, the block size is also made to be large and thus it is effective in creating the low-frequency image.

Therefore, the size of the mask region and the size of a predetermined region are associated with each other so that the size of the predetermined region is also made to be large when the mask region is large, and the size of the predetermined region is also made to be small when the mask region is small, thereby allowing an image having a tendency to confirm the outline to be obtained while protecting privacy. When the mask region is dynamically set using face detection or the like, and the size of the block is also dynamically set depending on the size of the detected mask region, it is possible to create an appropriate low-frequency image having a tendency to confirm the general situation of a shooting location while protecting privacy.

Meanwhile, in the present embodiment, an example in which the block average is used in the low-frequency image generation unit has been described, but a smoothing filter can also be used. When the smoothing filter is used in the low-frequency image generation unit, it is possible to realize the same effect by providing a smoothing filter setting unit instead of the region size setting unit 1602.

Specifically, the size of a neighboring pixel used in the smoothing filter and a filter coefficient are set in the smoothing filter setting unit, the size of the neighboring pixel used in smoothing is made to be large when the degree of protecting privacy is desired to be strengthened, and the size of the neighboring pixel is made to be small when the degree is desired to be weakened, thereby allowing the strength of privacy protection of the low-frequency image to be freely adjusted. When the size of the neighboring pixel used in smoothing is dynamically set in association with the size of the mask region, similarly to a case where the block average is used, it is possible to create an appropriate low-frequency image having a tendency to confirm the general situation of a shooting location while protecting privacy.

Meanwhile, in the present embodiment, the mask region is determined by person detection or the like, and the region size for creating the low-frequency image (averaging the pixels) is determined accordingly, but the region size may not be associated with the mask region.

Specifically, it is possible to make determination of the region size independently of the mask region, such as the determination of the mask region by detecting the size of a person and the determination of the region size capable of protecting privacy depending on the size of a person.

With such a configuration as described above, the image details of only the region relating to privacy can be caused not be confirmed. In addition, it is possible to perform restoration with a simple configuration without requirement for the storage of the number of regions or position information relating to privacy. Therefore, it is possible to provide a monitoring camera having higher convenience to a user. In addition, since the size of the predetermined region for creating the low-frequency image can be arbitrarily changed, it is possible to freely adjust the degree of privacy protection while minimizing a decrease in an encoding efficiency, and to provide a monitoring camera system in which the degree of freedom of the application or the installation position of a camera is considerably improved.

Meanwhile, in Embodiment 2, the first communication apparatus 103 is as described above, but other configurations are the same as those of Embodiment 1.

Meanwhile, as in the present embodiment, the reason to change the mask region and the region size is because focusing on the spatial frequency of an image, the spatial frequency components of the image are divided into the low-frequency image and the difference image and are transmitted to the image encoding unit 203, while maintaining the components.

Generally, when a privacy-protected image is created, a problem of an increase in the amount of data or a deterioration in image quality occurs, and thus the creation of the image is performed in the inside of the image encoding unit. Specifically, variable-length encoding data in the image encoding unit is realized by switching or conversion in encoding units, block units or the like. For this reason, the degree of freedom of a switching method or a conversion method is constrained by the configuration of the image encoding unit, and thus it is not possible to realize privacy protection in which the mask region or the region size is freely set.

In addition, in order to create the privacy protection image in the inside of the image encoding unit, an image encoding unit having a special configuration is required rather than a standard system. For this reason, the image decoding unit for image restoration also requires a special configuration, and thus a target device is restricted.

In that regard, when the privacy-protected image can be created in front of the image encoding unit, the image encoding unit may just utilize a unit used in the related art, and can be realized simply.

However, as described in Embodiment 1, when privacy is attempted to be protected using noise, the spatial frequency components included in an original image are changed, and thus restoration to an original frame image is not performed, or the amount of data increases.

Therefore, in the present embodiment, division into the low-frequency image and the difference image is performed so that the mask region and the region size can be freely set and restoration to an original frame image can be performed.

Embodiment 3

Figure 22:
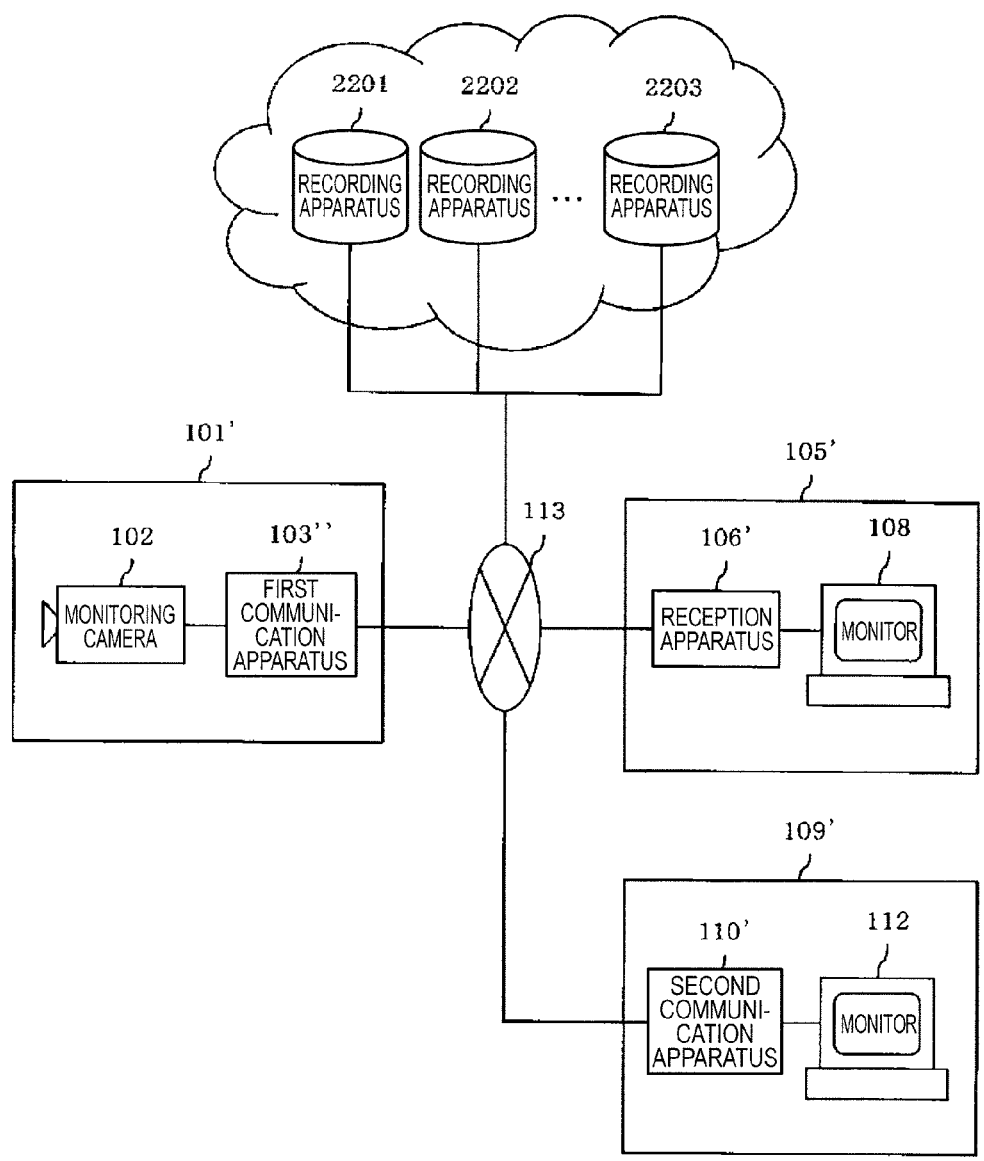
FIG. 22 is a schematic diagram illustrating the entire configuration of a monitoring camera system according to Embodiment 3 of the present invention.

FIG. 22 is a schematic diagram illustrating the entire configuration of a monitoring camera system according to Embodiment 3 of the present invention. Meanwhile, components having the same functions as those in Embodiments 1 and 2 are denoted by the same reference numerals and signs, and thus the description thereof will not be given.

FIG. 22 illustrates an imaging system 101'. The imaging system 101' includes a monitoring camera 102, and a first communication apparatus 103", which are connected to each other by an internal network.

FIG. 22 also illustrates a reproduction system 105'. The reproduction system 105' includes a reception apparatus 106', and a monitor 108, which are also connected to each other by a separate internal network from the imaging system 101'.

FIG. 22 also illustrates a restoration system 109'. The restoration system 109' includes a second communication apparatus 110' which is connected to a monitor 112 by a separate internal network from the imaging system 101'.

In addition, recording apparatuses 2201, 2202, and 2203 are installed outside a network such as a cloud network. The imaging system 101', the reproduction system 105', and the restoration system 109' are externally connected to the recording apparatuses 2201, 2202, and 2203 through the network 113.

Here, the first communication apparatus 103" in the imaging system 101' includes means for ciphering data. In addition, the second communication apparatus 110' in the restoration system 109' includes means for restoring the ciphered data. Such means is included, and thus privacy-protected low-frequency image data or difference image data for restoration can be more safely recorded in a recording apparatus connected outside a network such as a cloud network, rather than a recording apparatus of an internal network.

Figure 23:
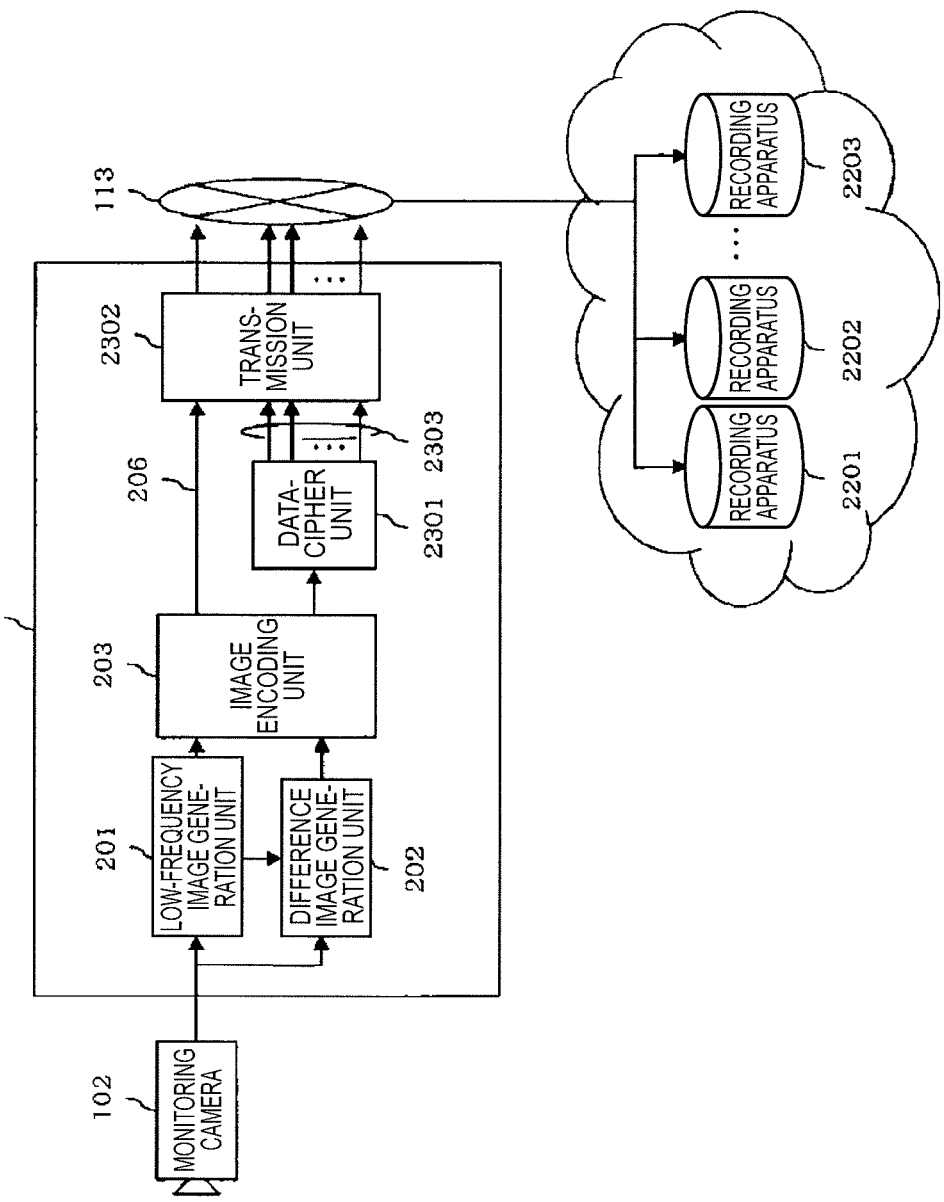
FIG. 23 is a block diagram of a first communication apparatus according to Embodiment 3 of the present invention.
Figure 24:
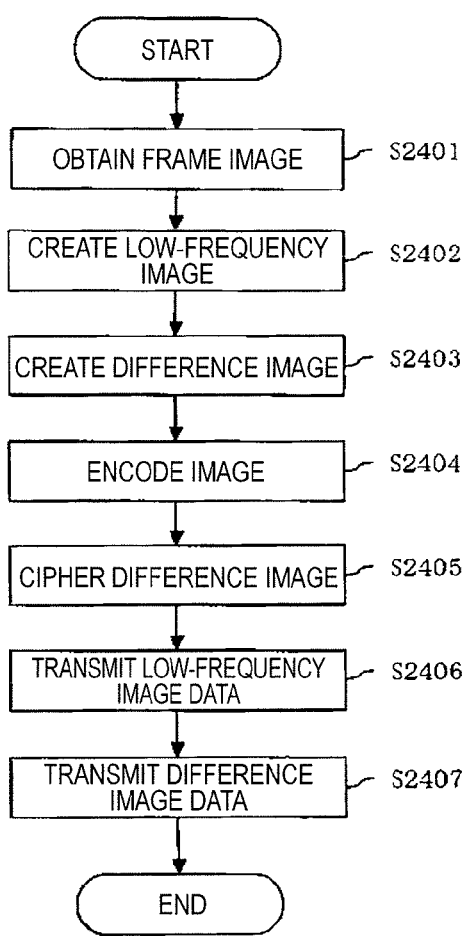
FIG. 24 is a flowchart of processing in the first communication apparatus according to Embodiment 3 of the present invention.

Next, the first communication apparatus 103" will be described in detail with reference to FIGS. 23 and 24. FIG. 23 is a block diagram of the first communication apparatus according to Embodiment 3 of the present invention, and FIG. 24 is a flowchart of processing in the first communication apparatus according to Embodiment 3 of the present invention.

FIG. 23 illustrates a low-frequency image generation unit 201, a difference image generation unit 202, an image encoding unit 203, a data-cipher unit 2301, a transmission unit 2302, a low-frequency image encoded data 206, and ciphered data of a difference image 2303.

Hereinafter, the flow of processing will be described with reference to a flowchart of FIG. 24.

First, the monitoring camera 102 forms an image of an optical signal in the vicinity of a camera onto an image sensor using a lens and converts the resultant signal into an electric signal, to obtain a frame image as digital data (S2401).

The low-frequency image generation unit 201 then creates a low-frequency image from the frame image (S2402).

Further, the difference image generation unit 202 creates a difference image between the frame image obtained in the monitoring camera 102 and the low-frequency image created in the low-frequency image generation unit 201 (S2403).

The image encoding unit 203 encodes the low frequency image created in the low-frequency image generation unit 201 and the difference image created in the difference image generation unit 202 (S2404).

The data-cipher unit 2301 ciphers the difference image encoded data encoded in the image encoding unit 203 using cryptography or secret sharing (S2405).

The transmission unit 2302 transmits the low-frequency image encoded data 206 encoded in the image encoding unit 203 through the network 113 (S2406). In addition, the ciphered data 2303 of the difference image ciphered in the data-cipher unit 2301 is transmitted through the network 113 (S2407). The transmitted data is recorded in any of the recording apparatuses 2201, 2202, and 2203 which are installed outside a cloud network or the like.

Hereinafter, the data-cipher unit 2301 will be described in detail.

The data-cipher unit 2301 ciphers the difference image encoded data using cryptography or secret sharing. Since information, such as a face of a person, relating to privacy is contained in the difference image, it is preferable that data be ciphered by encryption, sharing or the like.

A method of using encryption is considered as a cipher method. Encryption includes a block cipher or a stream cipher which is a symmetric-key cipher. Triple DES (Data Encryption Standard), AES (Advanced Encryption Standard) or the like can be applied as the block cipher, and RC4 or the like can be applied as the stream cipher. By using encryption, it is possible to rewrite the difference image encoded data including privacy information to information which cannot be understood by a third party, and to obtain computational safety.

Meanwhile, the encryption methods are not limited thereto, but it is possible to use other methods such as public key cryptography capable of achieving an object. Meanwhile, when encryption is used, the management of a key is required to be separately performed.

Figure 25:
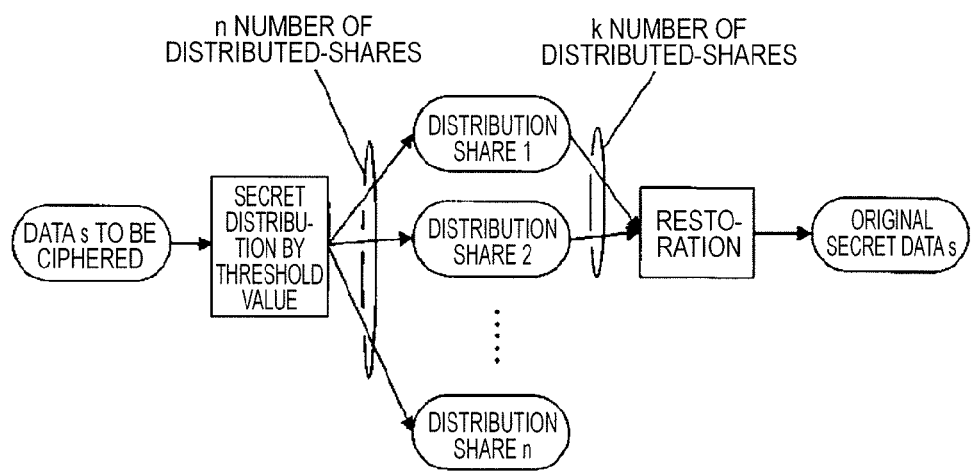
FIG. 25 is a diagram illustrating a threshold secret sharing scheme.

As cipher methods other than encryption, a method of using secret sharing is also considered. The secret sharing includes a threshold secret sharing scheme. FIG. 25 is a diagram illustrating the threshold secret sharing scheme. The term "threshold secret sharing" as used herein refers to a scheme in which data s which is desired to be kept secret is distributed and stored in n distributed-shares, and k(k≤m) distributed-shares are collectively restored, to thereby obtain original secret data s. The distributed-share is converted into information which cannot be understood by a third party, and cannot be decoded by computation, whereby information-theoretic safety can be obtained. The threshold secret sharing described herein is referred to as a (k, n) threshold secret sharing scheme of threshold k and the number of shares n.

Meanwhile, the secret sharing includes many other variations such as (k, L, n) ramp-type secret sharing of threshold k, the number of partitions L and the number of shares n, secret sharing having no threshold, polynomial secret sharing, and secret sharing in which speeding up is performed using exclusive OR, in addition the (k, n) threshold secret sharing.

A description is given herein using the threshold secret sharing as an example, but it is possible to use schemes capable of achieving an object of the present invention even when other secret sharing schemes are used. Since redundancy can be provided by performing distributed management with a plurality of shares, restoration can be performed even when a portion of stored data is lost. Thus, it is also possible to improve the reliability of a system by using the secret sharing.

In addition, when the secret sharing is used, the management of a key required for encryption is not required. When the ramp-type secret sharing is used, there is also an effect that the amount of data of ciphered data of the difference image can be reduced to 1/L. Meanwhile, when the secret sharing scheme is used, since a plurality of distributed-shares are generated, the encoded data of the difference image is distributed and stored into plural pieces. Specifically, when the number of shares is n, n pieces of data applied to the difference image are output.

In addition, in FIG. 23, the ciphered data 2303 of the difference image which is an output of the data-cipher unit 2301 are described as a plurality of outputs being present. However, when cryptography is used in the cipher method, the number of outputs is one. In addition, when the secret sharing is used in the cipher method, the number of outputs is n if the number of shares of the secret sharing is n.

Figure 26:
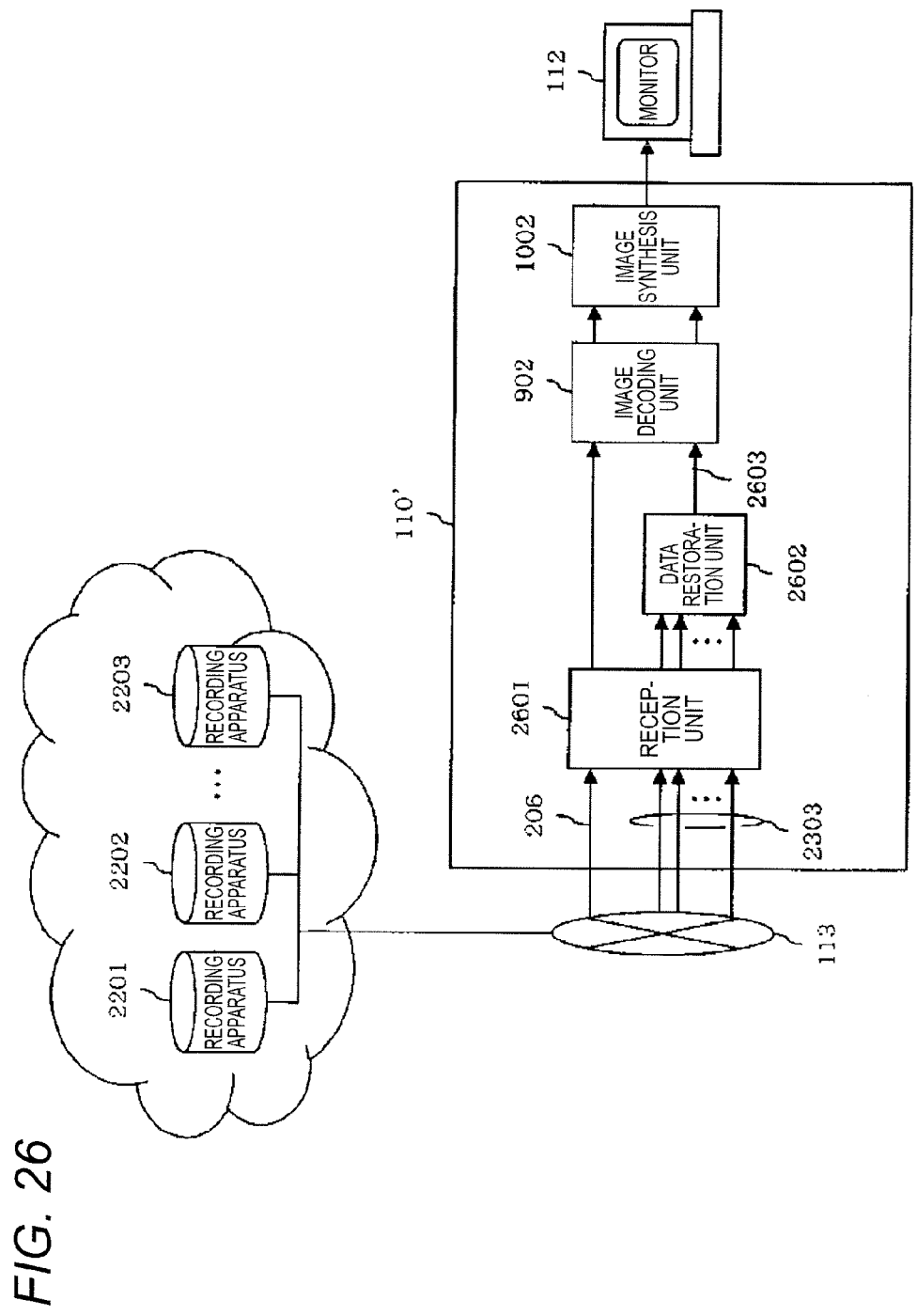
FIG. 26 is a block diagram of a second communication apparatus according to Embodiment 3 of the present invention.
Figure 27:
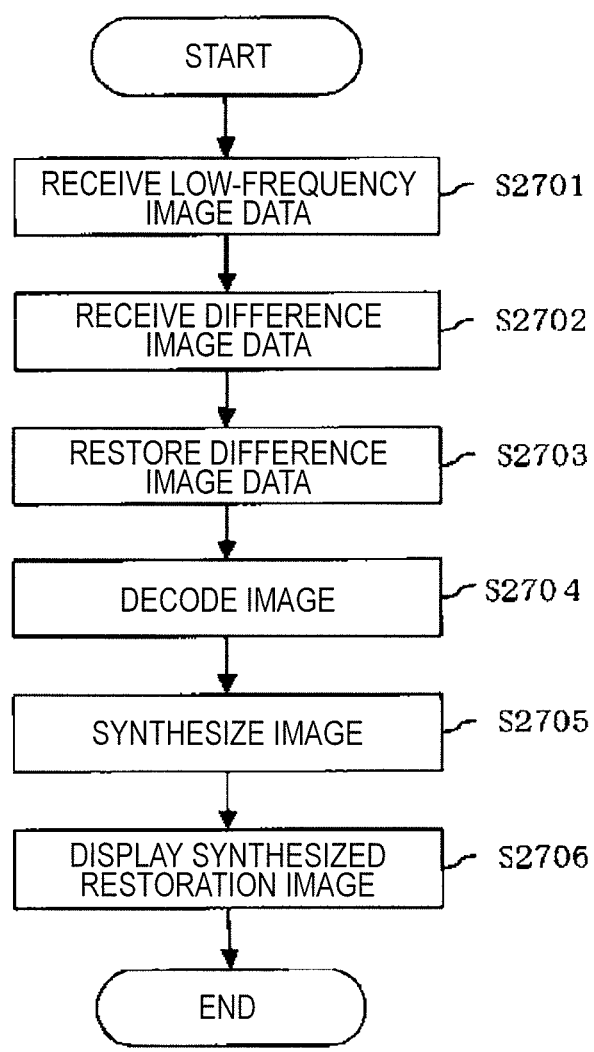
FIG. 27 is a flowchart of processing in the second communication apparatus according to Embodiment 3 of the present invention.

Next, restoration processing of the second communication apparatus 110' will be described in detail with reference to FIGS. 26 and 27. FIG. 26 is a block diagram of the second communication apparatus according to Embodiment 3 of the present invention, and FIG. 27 is a flowchart of processing in the second communication apparatus according to Embodiment 3 of the present invention.

FIG. 26 illustrates a reception unit 2601, a data restoration unit 2602, an image decoding unit 902, an image synthesis unit 1002 that synthesizes the decoded low-frequency image and the difference image, low-frequency image encoded data 206, ciphered data 2303 of the difference image, and difference image encoded data 2603.

Hereinafter, a flow of processing will be described with reference to a flowchart of FIG. 27.

First, the reception unit 2601 receives the low-frequency image encoded data 206 from any of the recording apparatuses 2201, 2202, and 2203 installed outside a cloud or the like through the network 113 (82701).

Next, the reception unit 2601 receives the ciphered data 2303 of the difference image from the recording apparatuses 2201, 2202, and 2203 installed outside similarly through the network 113 (S2702).

The data restoration unit 2602 then restores the ciphered data 2303 of the difference image (S2703). It is possible to obtain the difference image encoded data 2603 by restoring the ciphered data.

Further, the image decoding unit 902 decodes the low-frequency image encoded data 206 and the difference image encoded data 2603, and creates a low-frequency image of one frame and data of the difference image (S2704).

The image synthesis unit 1002 synthesizes the low-frequency image and the difference image, and creates a restoration image (S2705).

Finally, the monitor 112 displays restoration image data which is a created frame image (S2706).

Hereinafter, the data restoration unit 2602 will be described in detail.

The data restoration unit 2602 restores the ciphered data 2303 of the difference image, and creates the difference image encoded data 2603. Since the cipher of the difference image encoded data is performed in the data-cipher unit 2301 of the first communication apparatus 103", the data restoration unit 2602 has to perform restoration using a cipher method applied in the data-cipher unit 2301. A method of using encryption in cipher or a method of using the secret sharing is considered, and thus a restoration method corresponding to these methods is required to be prepared. Meanwhile, when the secret sharing scheme is used in cipher, a plurality of distributed-shares are generated, and thus the ciphered data of the difference image is distributed and stored to plural pieces. When the number of shares (thresholds) required for restoration is k, k pieces of data applied to the difference image are required to be collected.

In addition, in FIG. 26, the ciphered data 2303 of the difference image which is an input of the reception unit 2601 and the data restoration unit 2602 is described as a plurality of inputs being present. However, when cryptography is used in the cipher method, the number of inputs is one. In addition, when the secret sharing is used in the cipher method, the number of inputs is k if the number of shares (thresholds) required for the restoration of the secret sharing is k.

With such a configuration as described above, it is possible to cipher data relating to the difference image including privacy information, and to provide a monitoring camera system having high confidentiality. That is, since the low-frequency image is an image of which the details cannot be confirmed, and the difference image of information relating to privacy is also entirely ciphered, data can be more safely recorded in an external server such as a recording apparatus on a cloud network. In addition, since conversion into the low-frequency image and the difference image is performed and then encoding or cipher is performed, a system can be constructed with a simple configuration using a general-purpose module, without requirement for the use of a special encoder. That is, it is possible to realize a monitoring camera system having high confidentiality with the amount of data almost as much as that of the related art, using a standard encoding module such as MPEG and H.264/AVC or a standard cipher module such as triple DES and AES.

Meanwhile, reproduction processing in the second communication apparatus of Embodiment 3 can be realized by performing the same processing as the reproduction processing described in the second communication apparatus of Embodiment 1.

In addition, in the present embodiment, cipher is performed on the difference image encoded data, but the difference image data may be ciphered without encoding. It goes without saying that the present invention can be applied to even a configuration in which the difference image is not encoded depending on a processing speed of encoding, a writing speed to a storage device, a transmission speed of a network, and the trade-off of cost involved in the storage device.

In addition, in the present embodiment, the imaging system 101' is configured such that the monitoring camera 102 and the first communication apparatus 103" are connected to each other by an internal network, but it goes without saying that the present invention can be applied even when both are entirely realized within a monitoring camera.

In addition, even when locations in which the low-frequency image and the difference image are recorded are locations other than the recording apparatus illustrated in the present embodiment, it goes without saying that an object of the present invention can be achieved.

In addition, in the present embodiment, cipher is performed on only the data relating to the difference image using the decryption or the secret sharing, but the cipher of data relating to the low-frequency image is not performed. The low-frequency image is not required to be ciphered because the image itself serves as a privacy-protected image. When the low-frequency image is ciphered, the image cannot be decoded and reproduced by a general-purpose reproduction system. With such a configuration as described in the present embodiment, it is possible to reproduce an image of which the outline can be confirmed while protecting privacy using a general-purpose reproduction system, and to confirm the details of the image by restoring cipher when necessary.

Embodiment 4

Figure 28:
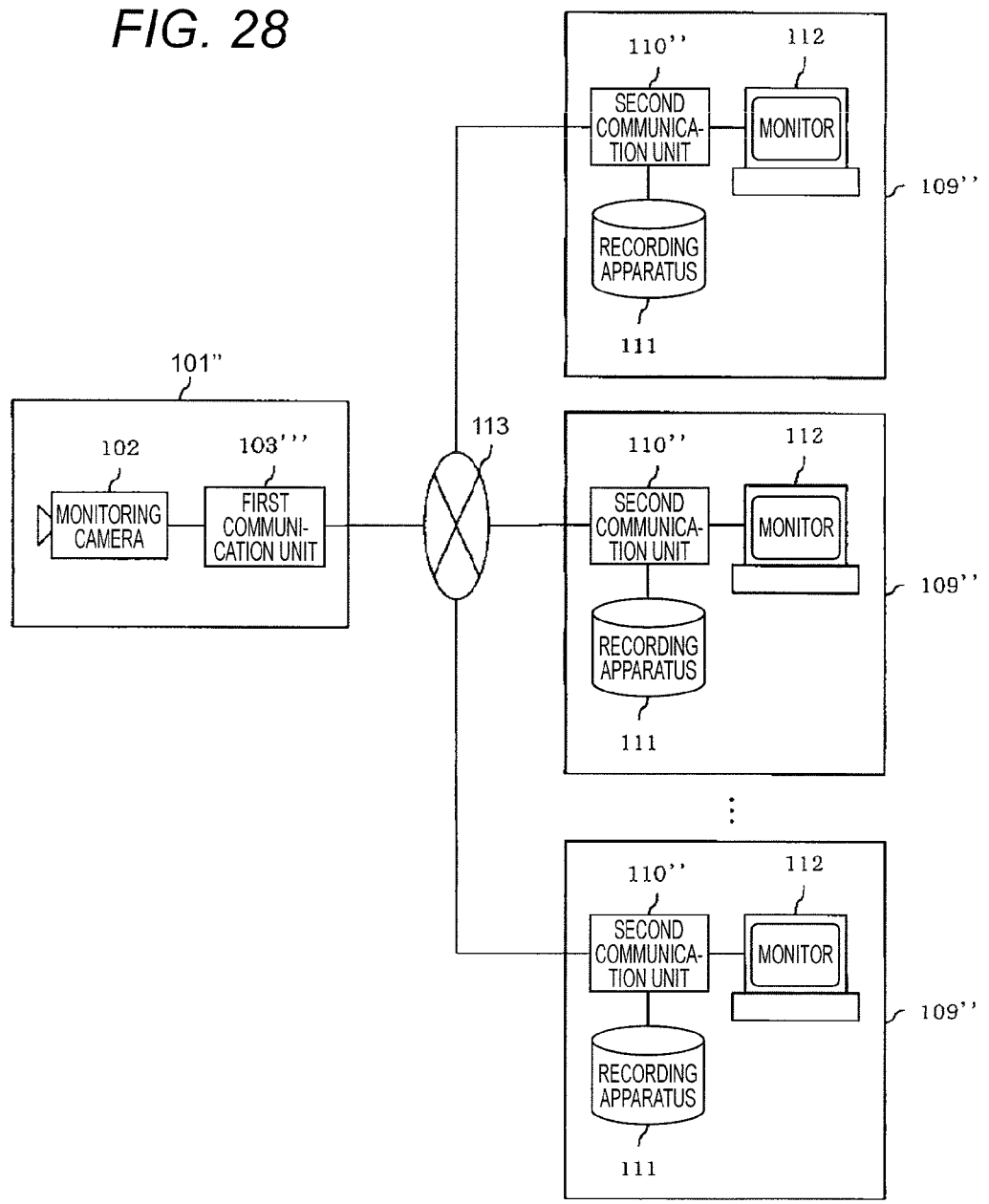
FIG. 28 is a schematic diagram illustrating the entire configuration of a monitoring camera system according to Embodiment 4 of the present invention.

FIG. 28 is a schematic diagram illustrating the entire configuration of a monitoring camera system according to Embodiment 4 of the present invention. Meanwhile, components having the same functions as those in Embodiments 1, 2 and 3 are denoted by the same reference numerals and signs, and thus the description thereof will not be given.

FIG. 28 illustrates an imaging system 101", a monitoring camera 102, and a first communication apparatus 103''', which are connected to each other by an internal network. FIG. 28 also illustrates a restoration system 109", a second communication apparatus 110", a recording apparatus 111, and a monitor 112, which are also connected to each other by an internal network. In addition, the imaging system 101" and a plurality of restoration systems 109" are externally connected to each other through the network 113.

The first communication apparatus 103''' in the imaging system 101" includes means for binding data of the low-frequency image and the difference image to one file. In addition, the second communication apparatus 110" in the restoration system 109" includes means for separating and extracting the data of the low-frequency image and the difference image from a binding file. Such means is included, and thus the low-frequency image and the difference image can be handled as one file without separately managing these images.

Hereinafter, in the present embodiment, an example will be described in which the secret sharing scheme of the number of shares n and the threshold k is used in data cipher and data restoration with respect to the first communication apparatus 103''' and the second communication apparatus 110".

Figure 29:
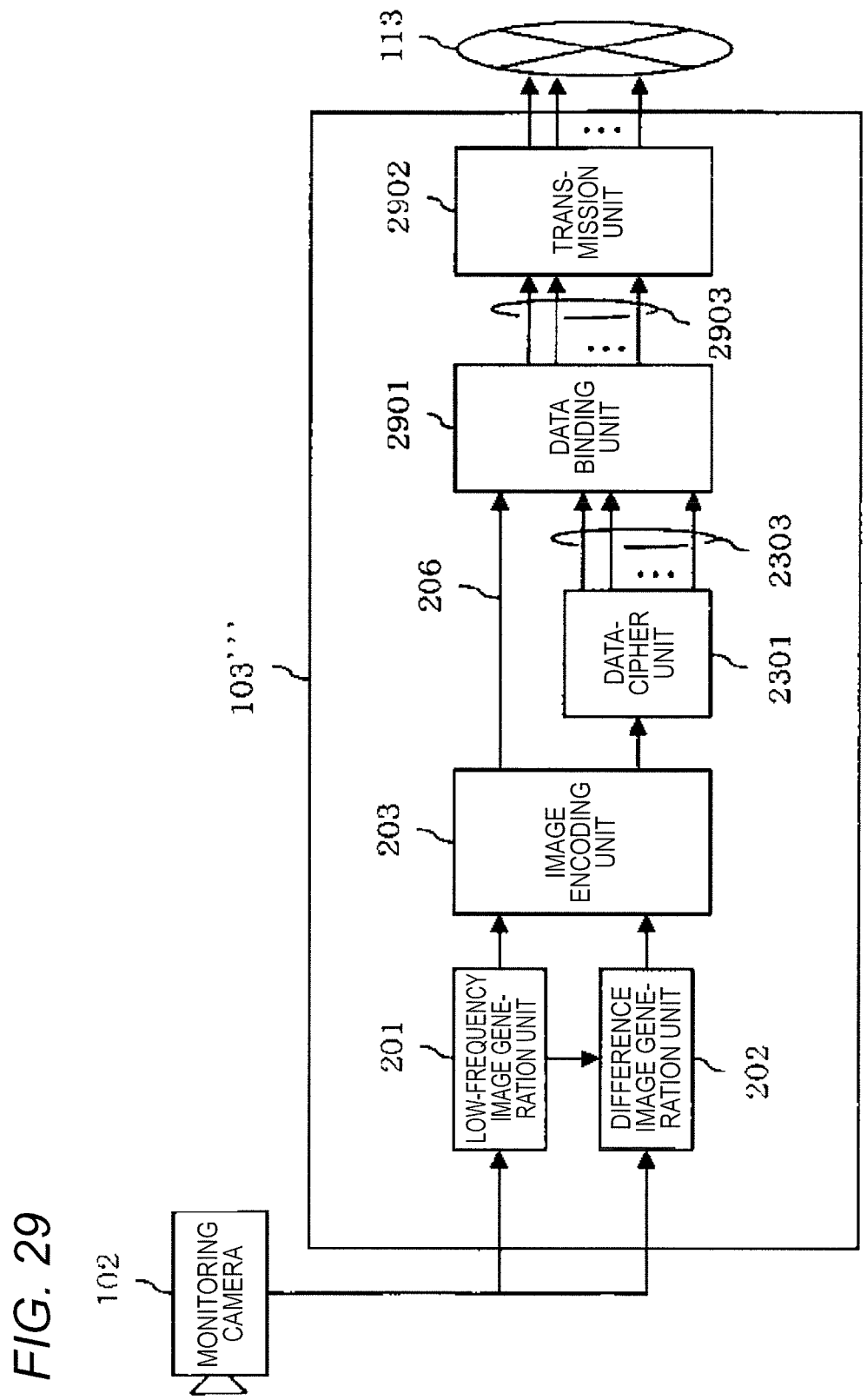
FIG. 29 is a block diagram of a first communication apparatus according to Embodiment 4 of the present invention.
Figure 30:
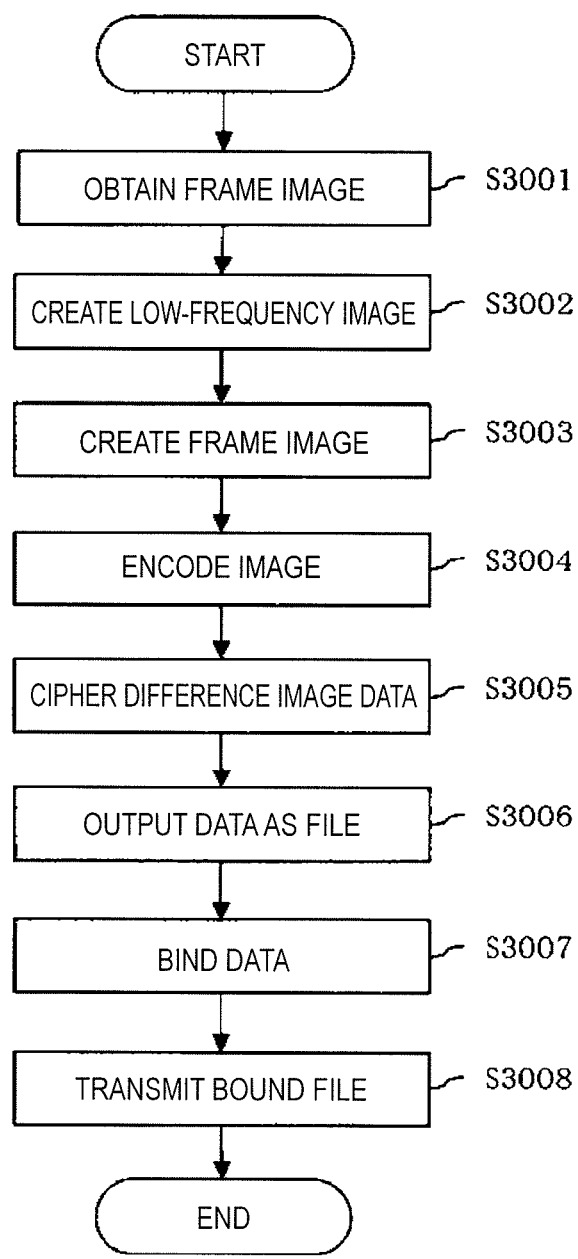
FIG. 30 is a flowchart of processing in the first communication apparatus according to Embodiment 4 of the present invention.

First, the first communication apparatus 103' will be described in detail with reference to FIGS. 29 and 30. FIG. 29 is a block diagram of the first communication apparatus according to Embodiment 4 of the present invention, and FIG. 30 is a flowchart of processing in the first communication apparatus according to Embodiment 4 of the present invention.

FIG. 29 illustrates a low-frequency image generation unit 201, a difference image generation unit 202, an image encoding unit 203, a data-cipher unit 2301, a data binding unit 2901, a transmission unit 2902, low-frequency image encoded data 206, ciphered data 2303 of a difference image, a data file 2903 in which the low-frequency image encoded data and the ciphered data of a difference image are bound to each other.

Hereinafter, a flow of processing will be described with reference to a flowchart of FIG. 30.

First, the monitoring camera 102 forms an image of an optical signal in the vicinity of a camera onto an image sensor using a lens and converts the resultant signal into an electric signal, to obtain a frame image as digital data (S3001).

The low-frequency image generation unit 201 then creates a low-frequency image from the frame image (S3002).

Further, the difference image generation unit 202 creates a difference image between the frame image obtained in the monitoring camera 102 and the low-frequency image created in the low-frequency image generation unit 201 (S3003).

The image encoding unit 203 encodes the low-frequency image created in the low-frequency image generation unit 201 and the difference image created in the difference image generation unit 202 (S3004).

The data-cipher unit 2301 ciphers difference image encoded data encoded in the image encoding unit 203 using the secret sharing (S3005).

The low-frequency image encoded data 206 encoded in the image encoding unit 203 and the ciphered data 2303 of the difference image created in the data-cipher unit 2301 are output as a temporary file (S3006). Meanwhile, the secret sharing is used in cipher, and thus n pieces of ciphered data of the difference image are created when the number of shares is n.

The data binding unit 2901 binds the low-frequency image encoded data 206 which is outputs as a file and the ciphered data 2303 of the difference image to create the data file 2903 (S3007). Since n pieces of ciphered data of the difference image are created, n data files 2903 are also created.

The transmission unit 2902 transmits the data file 2903 bound in the data binding unit 2901 to the restoration system 109" through the network 113 (S3008). Since n data files 2903 are distributedly managed, the data files 2903 are transmitted to a plurality of restoration systems 109".

Hereinafter, the data binding unit 2901 will be described in detail.

Figure 31:
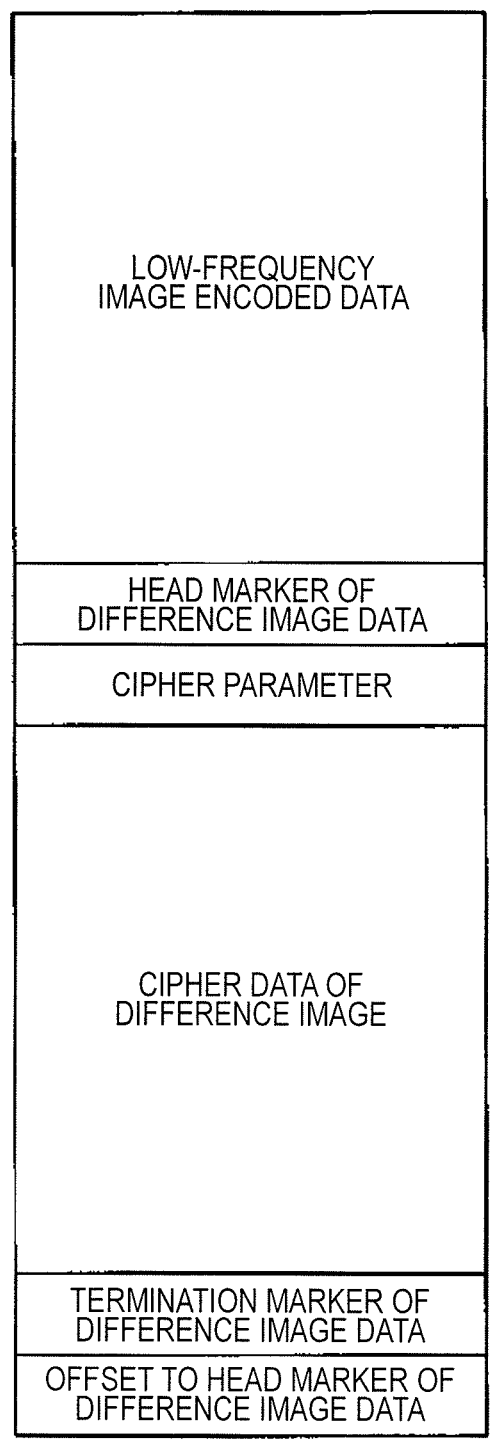
FIG. 31 is a diagram illustrating a configuration of a binding file.

The data binding unit 2901 binds the low-frequency image encoded data which is output as a temporary file to the file of the ciphered data of the difference image. FIG. 31 is a diagram illustrating a configuration of the bound file. In FIG. 31, the low-frequency image encoded data is stored in the bound file from a head. Subsequently to the low-frequency image encoded data, a head marker of the difference image data is stored, and then a cipher parameter is stored. The cipher parameter is a parameter required for the restoration of the ciphered data of the difference image.

When cipher is performed using the threshold secret sharing scheme, for example, the number of shares, the threshold, the data size before or after the secret sharing, and the like are stored as the cipher parameters. Subsequently, the ciphered data of the difference image is stored. Finally, a termination marker of the difference image data is stored, and then offsets from a file termination to a head marker of the difference image data are stored.

Figure 32:
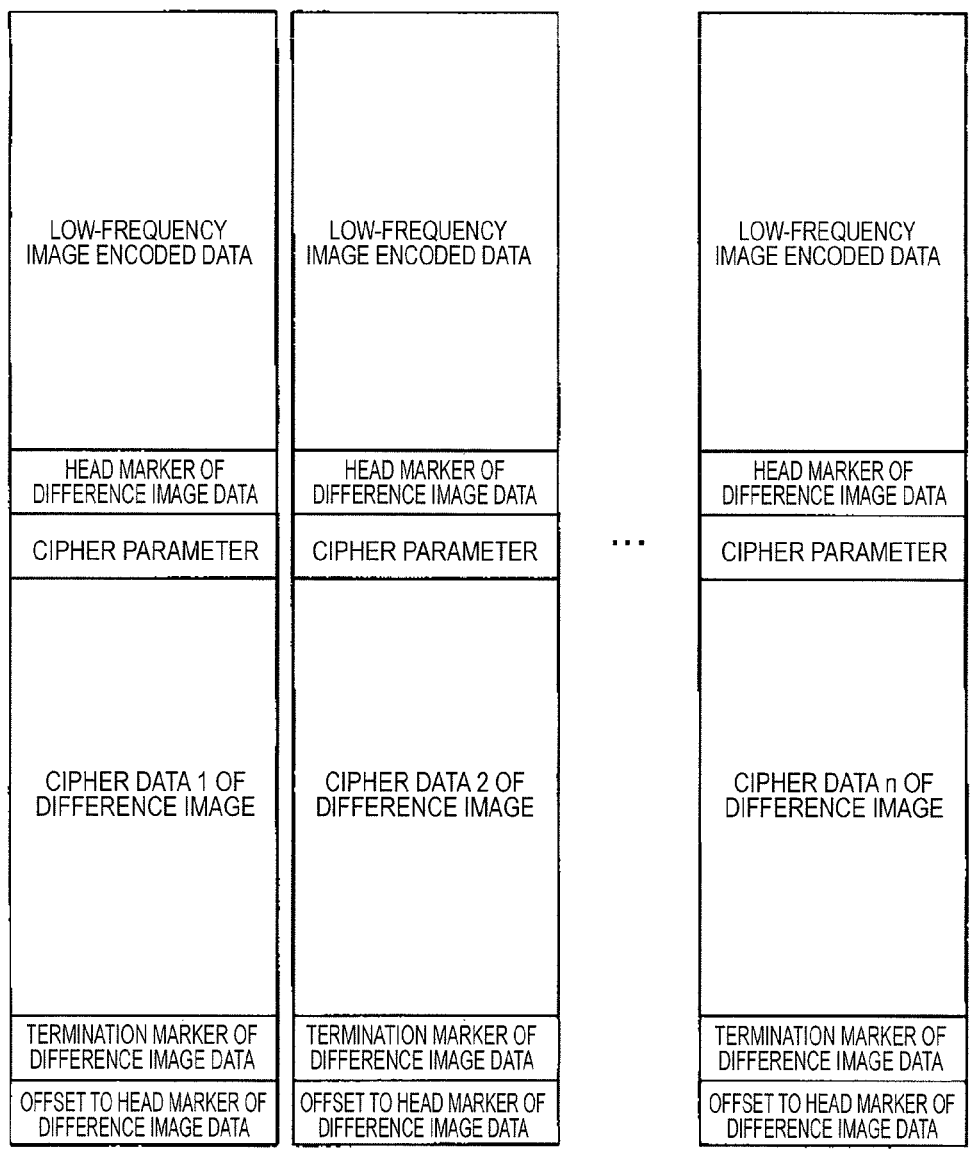
FIG. 32 is a diagram illustrating a configuration of the binding file when secret sharing is used in cipher.

FIG. 32 is a diagram illustrating of a configuration of the bound file when the secret sharing is used in the data-cipher unit 2301. When the secret sharing of the number of shares n is applied, n pieces of ciphered data of the difference image are created. Therefore, n bound files are also created. All the pieces of the low-frequency image encoded data stored in the head of each file are the same as each other, but pieces of ciphered data of the difference image stored subsequently become n pieces of distributed data different from each other.

Meanwhile, an example is illustrated herein in which the low-frequency image encoded data and the ciphered data of the difference image are bound to each other, but it goes without saying that the present invention can be applied regardless of whether the low-frequency image is encoded. In addition, it goes without saying that the present invention can be applied regardless of whether the difference image is encoded or ciphered. It is possible to achieve the object of the present invention by creating a data file in which the respective files are bound to each other.

In addition, the configuration of the binding file is not limited to an example shown in FIG. 31 or FIG. 32. The binding file has to be decoded and reproduced as the low-frequency image by a general-purpose reproduction system, and thus data relating to the low-frequency image is required to be stored in the head. However, when data relating to the difference image is configured such that data or a necessary parameter is able to be extracted during restoration, the object of the present invention can be achieved even in case where the configuration of FIG. 31 or FIG. 32 is not used.

In addition, in FIG. 29, the ciphered data 2303 of the difference image and the binding file 2903 are described as a plurality of outputs being present. When the secret sharing is used in the cipher method, the number of outputs is n if the number of shares of the secret sharing is n. If cryptography is used in the cipher method, the number of outputs is one.

Next, processing of the second communication apparatus 110" will be described in detail. The second communication apparatus can perform reproduction processing and restoration processing in the same manner as described in Embodiment 1.

Figure 33:
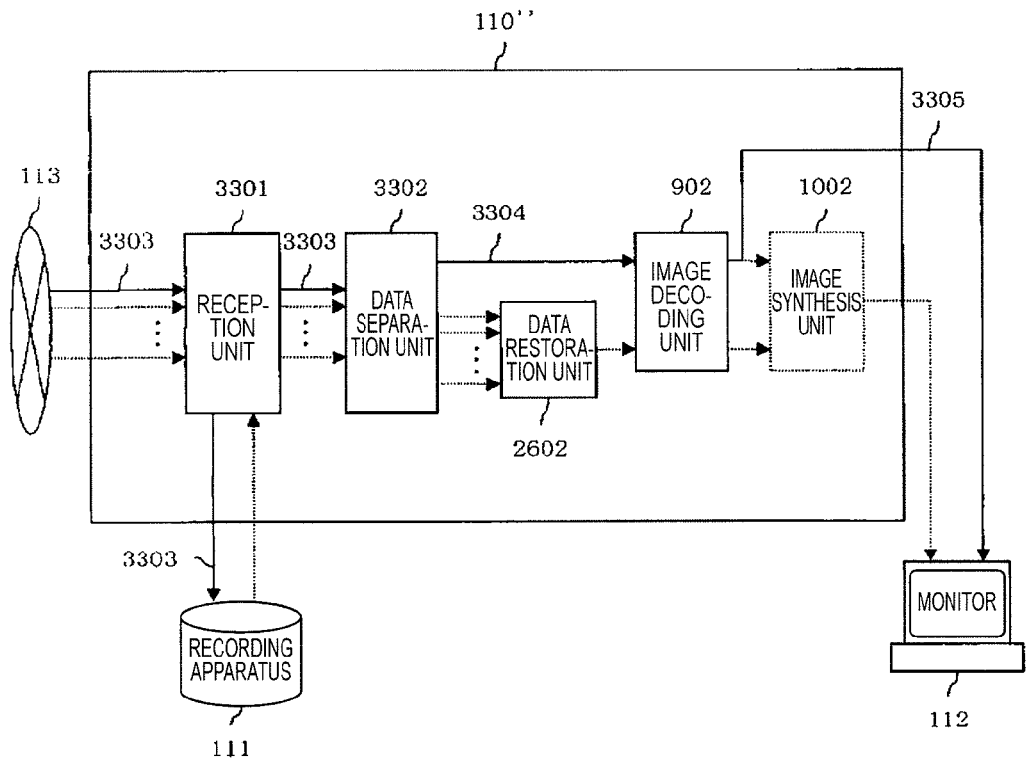
FIG. 33 is a block diagram of a second communication apparatus according to Embodiment 4 of the present invention during reproduction.
Figure 34:
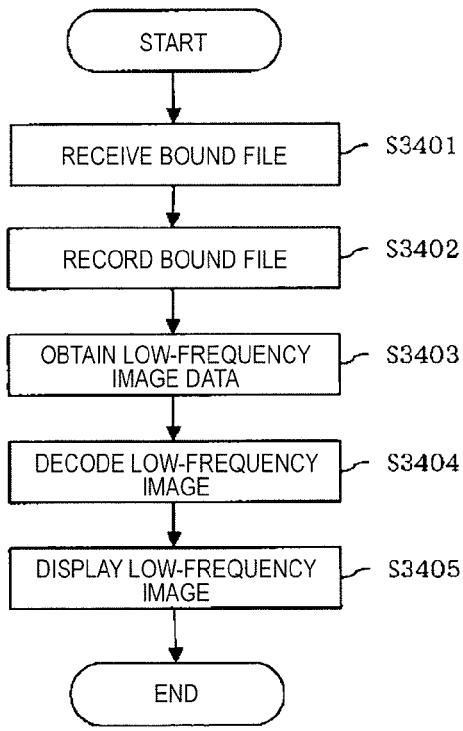
FIG. 34 is a flowchart of reproduction processing in the second communication apparatus according to Embodiment 4 of the present invention.

First, the reproduction processing of the second communication apparatus 110" will be described in detail with reference to FIGS. 33 and 34. FIG. 33 is a block diagram of the second communication apparatus according to Embodiment 4 of the present invention during reproduction, and FIG. 34 is a flowchart of the reproduction processing in the second communication apparatus according to Embodiment 4 of the present invention.

FIG. 33 illustrates a reception unit 3301, a data separation unit 3302, a data restoration unit 2602, an image decoding unit 902, an image synthesis unit 1002, a data file 3303 in which the low-frequency image encoded data and the ciphered data of the difference image are bound to each other, low-frequency image encoded data 3304, and low-frequency image data 3305.

Hereinafter, a flow of processing will be described with reference to a flowchart of FIG. 34.

First, the reception unit 3301 receives the data file 3303 in which the low-frequency image encoded data and the ciphered data of the difference image are bound to each other, from the imaging system 101 through the network 113 (S3401).

Next, the reception unit 3301 records the received binding file 3303 in the recording apparatus 111 (S3402).

Further, the data separation unit 3302 obtains the low-frequency image encoded data 3304 from the binding file (S3403). However, the low-frequency image encoded data is stored in the head of the binding file and thus can be obtained just by reading data from the file head without performing a special process.

The image decoding unit 902 then decodes the low-frequency image encoded data 3304, and creates the low-frequency image data 3305 of one frame (S3404).

Finally, the monitor 112 displays the low-frequency image data 3305 which is a created frame image (S3505).

Since the low-frequency image data is merely decoded during normal reproduction, all the details of the image cannot be confirmed just by a privacy-protected image being displayed. In addition, the binding file 3303 is required even during restoration and thus is recorded in the recording apparatus 111.

In addition, even when the binding file 3303 is received by the system having a configuration as shown in the reproduction system 105 of Embodiment 1, the file can be reproduced as a privacy-protected image.

Figure 35:
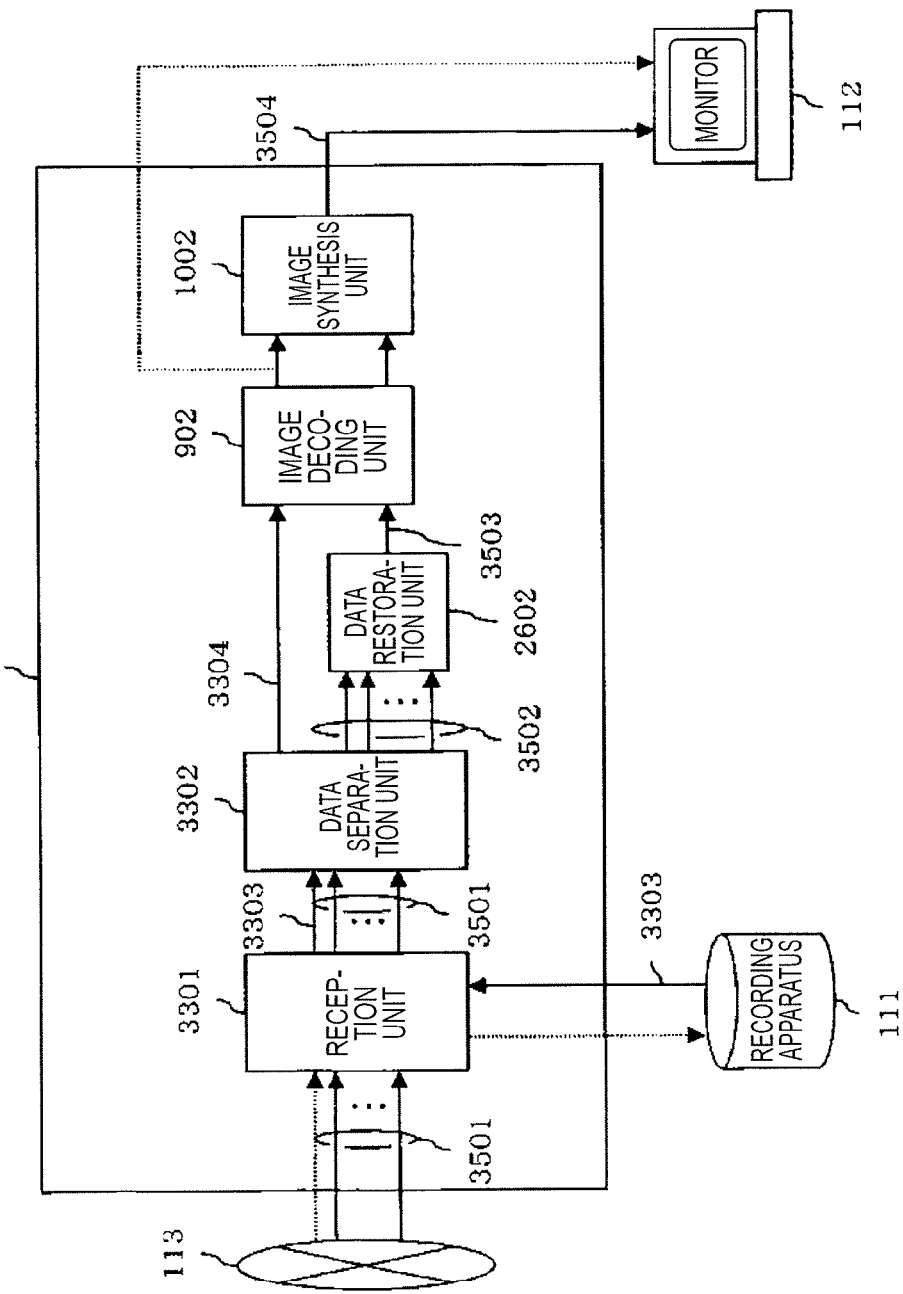
FIG. 35 is a block diagram of the second communication apparatus according to Embodiment 4 of the present invention during restoration.
Figure 36:
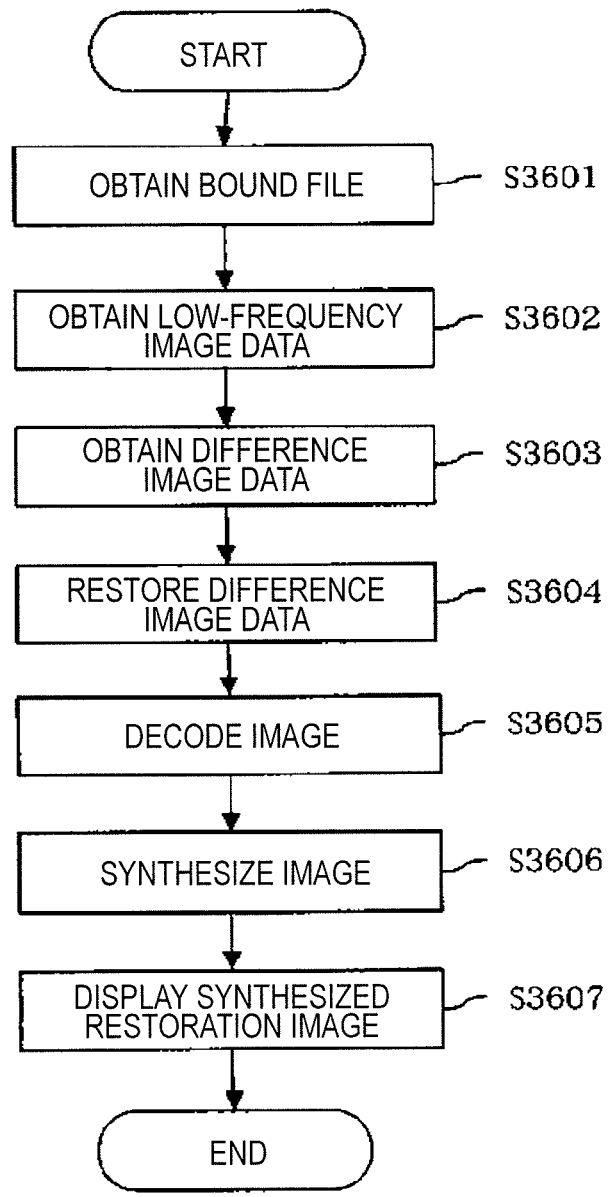
FIG. 36 is a flowchart of restoration processing in the second communication apparatus according to Embodiment 4 of the present invention.

Next, the restoration processing of the second communication apparatus 110" will be described in detail with reference to FIGS. 35 and 36. FIG. 35 is a block diagram of the second communication apparatus according to Embodiment 4 of the present invention during restoration, and FIG. 36 is a flowchart of the restoration processing in the second communication apparatus according to Embodiment 4 of the present invention.

FIG. 35 illustrates a reception unit 3301, a data separation unit 3302, a data restoration unit 2602, an image decoding unit 902, an image synthesis unit 1002, data files 3303 and 3501 in which the low-frequency image encoded data and the ciphered data of the difference image are bound to each other, low-frequency image encoded data 3304, ciphered data 3502 of the difference image, difference image encoded data 3503, and a restoration image 3504.

Hereinafter, a flow of processing will be described with reference to a flowchart of FIG. 36.

First, the reception unit 3301 obtains the data file 3303 in which the low-frequency image encoded data and the ciphered data of the difference image which are recorded in the recording apparatus 111 are bound to each other. In addition, data file which is a distributed-share is required for the restoration of the secret sharing by the number of thresholds k. For this reason, k−1 data files 3501 recorded in other restoration systems 109" are received and obtained through the network 113 (S3601).

Next, the data separation unit 3302 separates the data files 3303 and 3501 into the low-frequency image encoded data and the ciphered data of the difference image, and obtains the low-frequency image encoded data 3304 (S3602). Specifically, a head address of the low-frequency image encoded data is obtained from the data file 3303. In the present embodiment, the data file has a configuration as shown in FIG. 32. Therefore, the head address of the low-frequency image encoded data is a head of the data file 3303.

Further, the ciphered data 3502 of the difference image is obtained from data separated in the data separation unit 3302 (S3603). Specifically, a head address of the ciphered data of the difference image is obtained from the data files 3303 and 3501. Offsets from a file termination to a head marker of the difference image data are stored in the terminations of the data files 3303 and 3501. Therefore, the head address of the ciphered data of the difference image can be obtained by movement by the offset from the file termination using this value. Since the secret sharing of the threshold k is used in data cipher, the number of pieces of the ciphered data of the difference image required for restoration is k. Therefore, k head addresses of the ciphered data of the difference image are obtained from k data files.

Further, the data restoration unit 2602 restores the ciphered data 3502 of the difference image (S3604). It is possible to obtain the difference image encoded data 3503 by restoring the ciphered data.

The image decoding unit 902 then decodes the low-frequency image encoded data 3304 and the difference image encoded data 3503, and creates a low-frequency image of one frame and data of the difference image (S3605).

The image synthesis unit 1002 synthesizes the low-frequency image and the difference image, and creates the restoration image 3504 (S3606).

Finally, the monitor 112 displays the restoration image data 3504 which is a created frame image (S3607).

Meanwhile, in FIG. 35, the binding file 3501 which is an input of the reception unit 3301 and the data separation unit 3302 is described as a plurality of inputs being present. When the secret sharing is used in the cipher method, the number of pieces of the ciphered data 3502 of the required difference image is k when the number of shares (thresholds) required for the restoration of the secret sharing is k. If cryptography is used in the cipher method, restoration can be performed only by the binding file 3303 recorded in the recording apparatus 111, and thus the number of inputs of the data restoration unit 2602 is one without requiring the reception of the binding file 3501.

Figure 37:
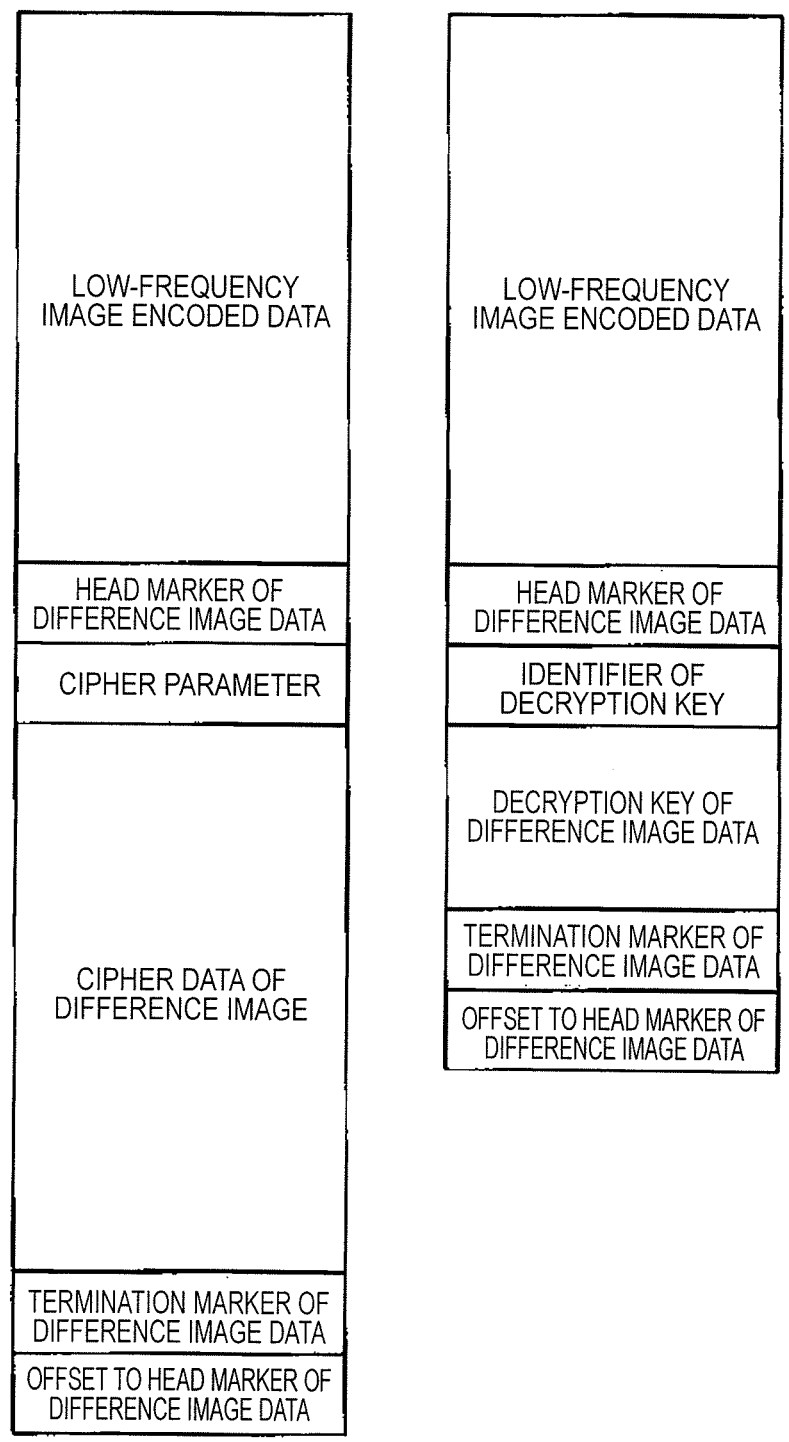
FIG. 37 is a diagram illustrating a configuration of the binding file using encrypted data and a decryption key.

In addition, in the present embodiment, an example in which the decryption or the secret sharing is used in the cipher of the difference image has been described, many other variations are considered in a method of creating the binding file. For example, as shown in FIG. 37, it is also considered that the difference image is separated into encrypted data of the difference image and a decryption key, and the encrypted data and the decryption key are bound to the low-frequency image encoded data and are recorded in different binding files. In this case, an identifier indicating the decryption key may be stored in the file having the decryption key stored therein, instead of storing a cipher parameter.

Figure 38:
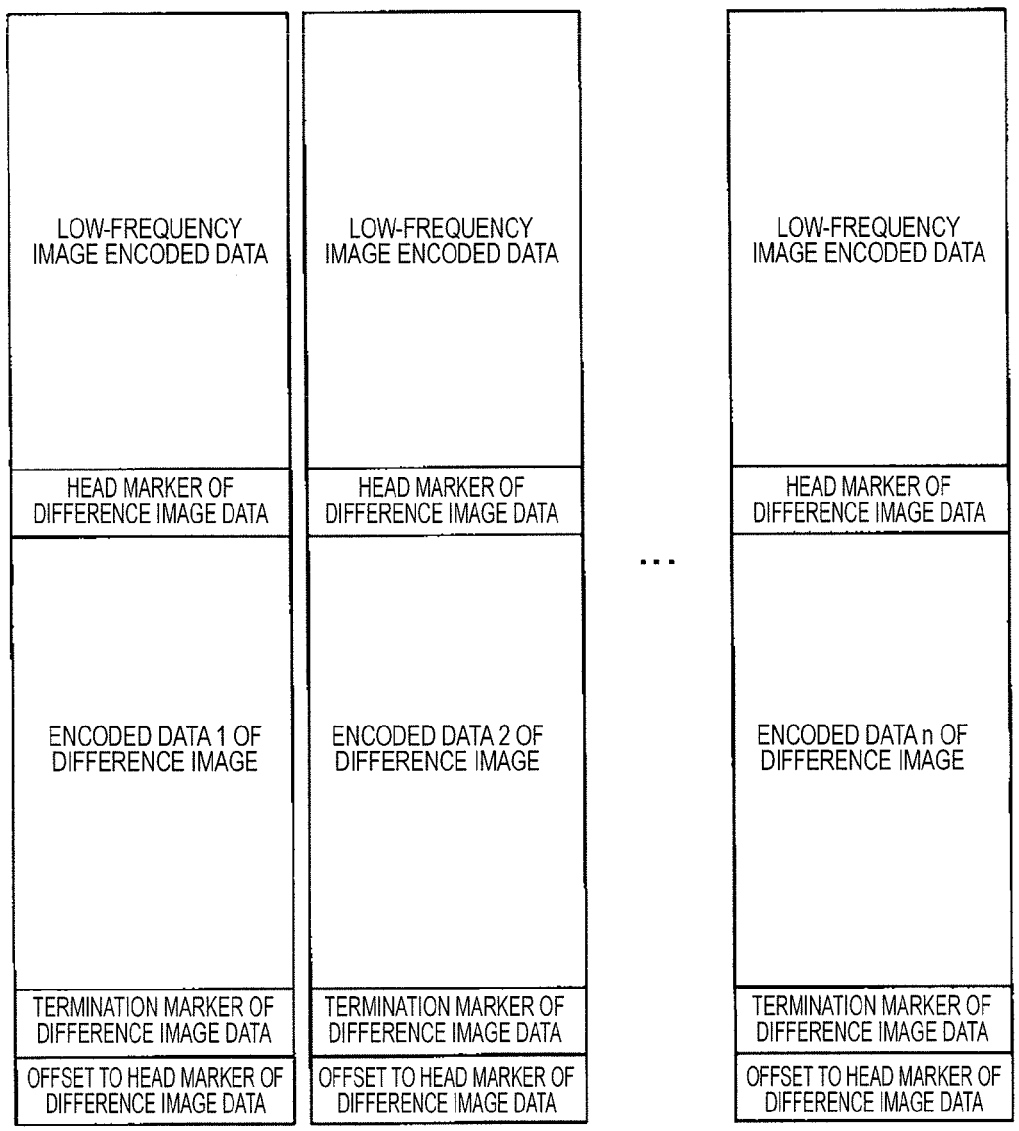
FIG. 38 is a diagram illustrating a configuration of the binding file when data is divided.

Alternatively, as shown in FIG. 38, it is also considered that the difference image encoded data is divided into n files, and each segment is bound to the low-frequency image encoded data and is recorded. Alternatively, the difference image data is divided into n files as it is, and thus each segment may be bound to the low-frequency image encoded data. The difference image encoded data is encrypted, and then each segment may be bound to the low-frequency image encoded data by dividing the encrypted data into n files.

Simply by dividing the data, the strength of cipher becomes weaker than the decryption or the secret sharing, but it is possible to reduce the load on a CPU to that extent, and to achieve the object of the present invention which is capable of restoration while protecting privacy. Therefore, from the viewpoint of a terminal to be used and the importance of privacy protection, appropriate use can be made.

With such a configuration as described above, the privacy-protected low-frequency image data and the ciphered data of the difference image required for restoration can be recorded as one file. This file can be reproduced as a privacy-protected image by a normal reception apparatus, and can be restored in case of emergency such as the occurrence of a crime. When the encryption is used in cipher, restoration can be performed using a key. In addition, when the secret sharing is used in cipher, restoration can be performed by collecting distributed files having necessary numbers.

For this reason, it is unnecessary to record the low-frequency image and the difference image separately, and file management is facilitated. Specifically, a file name of the difference image data or a recorded location (such as a file path) which corresponds to the low-frequency image data is not required to be managed and recorded using a table or the like.

In addition, when seen from a user, an image can be handled in the same manner as binary data on which the decryption or the secret sharing is performed. A detailed description is as follows. For example, when data is encrypted, encrypted data becomes meaningless binary data, but when decoding is performed using a key, the data becomes meaningful data file. When the secret sharing is performed on the data, distributed data becomes meaningless binary data, but when distributed-shares having numbers required for restoration are restored collectively, the data becomes meaningful data file.

Similarly, when the encryption of the present invention is applied to the image data, the encrypted data can be reproduced as only a privacy-protected image, but when decoding is performed using a key, the data can be reproduced as an image of which all the details are able to be confirmed. In addition, when the secret sharing of the present invention is applied to the image data, the distributed data can be reproduced as only a privacy-protected image, but when the distributed-shares having numbers required for restoration are restored collectively, the data can be reproduced as an image of which all the details are able to be confirmed. That is, when seen from a user, it is possible to handle a file using the same interface as the normal decryption or the secret sharing, and to reproduce the file as an original image at the time of restoration. Meanwhile, even when the file is not restored, reproduction can be performed while an outline is confirmed as the privacy-protected image data.

In addition, when the secret sharing is used in cipher, it is possible to construct a system in which not only confidentiality is high, but also disaster resistance and failure resistance are high as a backup, and to realize a monitoring camera system having high convenience to a user.

The communication system, the communication apparatus and the communication method according to the present invention may be useful in a system desired to confirm the details of an image as necessary while protecting privacy normally, and are useful in, for example, a monitoring camera system.

The present application is based on and claims the benefit of Japanese patent application No. 2013-83532 filed on Apr. 12, 2013, the contents of which are incorporated herein by reference in its entirety.

What is claimed is:

1. A communication system that comprises a first communication apparatus, a second communication apparatus and a plurality of servers, wherein
the first communication apparatus includes:
a partial image data generator, configured to generate partial image data which is obtained by extracting a partial component from image data;
a difference image data generator configured to generate difference image data wherein the difference image data indicates a difference between the image data and the partial image data generated by the partial image data generator;
an encoder configured to encode the difference image data;
an encryptor, configured to generate encrypted data encrypted by the encoded difference image data, and
a transmitter configured to transmit the partial image data generated by the partial image data generator to one of the plurality of servers, and transmit the encrypted data to an other of the plurality of servers, and
the plurality of servers includes:
server-memory, configured to store, as data, the partial image data or the encrypted data transmitted by the transmitter,
the second communication apparatus includes:
a receiver, configured to receive the partial image data received from the server-memory of the one of the plurality of servers in which the partial image data is stored and further receives the encrypted data received from the server-memory of the other of the plurality of servers, and
a decryptor, configured to generate the difference image data decrypted by the encrypted data
wherein the encryptor of the first communication apparatus generates a plurality of secret sharing data as the encrypted data and transmits the plurality of secret sharing data to the transmitter,
the transmitter of the first communication apparatus transmits at least some of the plurality of secret sharing data to one of the plurality of servers,
the server-memory stores, as data, the partial image data or the at least some the plurality of the secret sharing data transmitted by the transmitter,
the receiver of the second communication apparatus receives secret sharing data less than or equal to the plurality of secret sharing data from the server-memory of the plurality of servers, and
the decryptor receives the plurality of the secret sharing data from the receiver and generates the difference image data decrypted by secret sharing data less than or equal to the plurality of secret sharing data.

2. The communication system according to claim 1, wherein the difference image data generator generates the difference image data from the original image data.

3. The communication system according to claim 1, wherein the receiver receives the partial image data from the server memory of the one of the plurality of servers in a privacy protected mode and in a non-privacy mode in which the details of the image need to be confirmed, and further receives the encrypted data, from the server memory of the other of the plurality of servers only in the non-privacy mode.

4. The communication system according to claim 1, wherein the partial image data is privacy-protected data such that not all details of an image reproduced by the image data can be confirmed but an outline of the image can be confirmed without restoring the image.

5. A communication system that comprises a first communication apparatus and a plurality of second communication apparatuses, wherein
the first communication apparatus includes:
a partial image data generator, configured to generate partial image data which is obtained by extracting a partial component from image data;
a difference image data generator configured to generate difference image data wherein the difference image data indicates a difference between the image data and the partial image data generated by the partial image data generator;
an encoder configured to encode the difference image data;
an encryptor configured to generate a plurality of secret sharing data encrypted by the encoded difference image data; and
a transmitter configured to transmit the partial image data and at least one of the plurality of secret sharing data generated by the encryptor to each of a different one of the plurality of second communication apparatuses, and
the second communication apparatuses include:
a receiver, configured to receive the partial image data and the at least one of the plurality of secret sharing data transmitted by the transmitter of the first communication apparatus and further to receive at least one of the plurality of secret sharing data from an other of the plurality of second communication apparatuses only in a non-privacy mode, and
a decryptor, configured to receive the at least two of the plurality of secret sharing data from the receiver and to generate the difference image data decrypted by the at least two of the plurality of secret sharing data only in the non-privacy mode.

6. The communication system according to claim 5, wherein the difference image data generator generates the difference image data from the image data.

7. The communication system according to claim 5, wherein the partial image data is privacy-protected data such that not all details of an image reproduced by the image data can be confirmed, but an outline of the image can be confirmed without restoring the image.

8. The communication system according to claim 5 further comprising a third communication apparatus, wherein the third communication apparatus includes:
a receiver, configured to receive the partial image data and the difference image data transmitted by the transmitter of the first communication apparatus whether in a privacy-protected mode or in the non-privacy mode, and
a decryptor, configured to receive the plurality of secret sharing data from the receiver and to generate the difference image data decrypted by the plurality of secret sharing data.

* * * * *